(12) United States Patent
Zerulla

(10) Patent No.: US 11,415,512 B2
(45) Date of Patent: Aug. 16, 2022

(54) ADDRESSABLE PLASMONIC ARRAYS

(71) Applicant: University College Dublin, National University of Ireland, Dublin, Dublin (IE)

(72) Inventor: Dominic Zerulla, Dublin (IE)

(73) Assignee: UNIVERSITY COLLEGE DUBLIN, NATIONAL UNIVERSITY OF IRELAND, DUBLIN, Dublin (IE)

( * ) Notice: Subject to any disclaimer, the term of this patent is extended or adjusted under 35 U.S.C. 154(b) by 2 days.

(21) Appl. No.: 16/771,149

(22) PCT Filed: Dec. 20, 2018

(86) PCT No.: PCT/EP2018/086253
§ 371 (c)(1),
(2) Date: Jun. 9, 2020

(87) PCT Pub. No.: WO2019/122161
PCT Pub. Date: Jun. 27, 2019

(65) Prior Publication Data
US 2021/0164900 A1    Jun. 3, 2021

(30) Foreign Application Priority Data
Dec. 21, 2017 (GB) ..................................... 1721611

(51) Int. Cl.
*G01N 21/552* (2014.01)
*G01N 21/64* (2006.01)
(Continued)

(52) U.S. Cl.
CPC ......... *G01N 21/553* (2013.01); *G01N 21/648* (2013.01); *G01N 21/658* (2013.01); *G01N 2021/1731* (2013.01)

(58) Field of Classification Search
CPC .......................... G01N 21/553; G01N 21/648
See application file for complete search history.

(56) References Cited

U.S. PATENT DOCUMENTS

| 5,341,215 A | * | 8/1994 | Seher | G01N 21/553 356/445 |
| 5,633,724 A | * | 5/1997 | King | G01N 21/648 356/445 |

(Continued)

FOREIGN PATENT DOCUMENTS

| EP | 2653903 A1 | 10/2013 |
| GB | 2447696 A | 9/2008 |

(Continued)

OTHER PUBLICATIONS

International Search Report & Written Opinion for International Application No. PCT/EP2018/086253, entitled "Addressable Plasmonic Arrays," Completed on Mar. 12, 2019; dated Mar. 25, 2019.

(Continued)

*Primary Examiner* — Rufus L Phillips
(74) *Attorney, Agent, or Firm* — Hamilton, Brook, Smith & Reynolds, P.C.

(57) ABSTRACT

An imaging apparatus (1) for imaging a sample (7) comprising an array of electronically addressable pixels (6) wherein each pixel is arranged to support a surface plasmon resonance thereinto generate an evanescent electromagnetic field (8) which extends transversely from the pixel so as to be salient from plane of the array for illuminating the sample (7). An optical detector (12) is arranged for detecting optical radiation (9, 10, 11) scattered from the evanescent electromagnetic field (8) by the sample (7). A processing unit (4) arranged to associate the detected optical radiation (9, 10, 11) with the address of the pixel or pixels within the array at which the surface plasmon resonance was generated.

10 Claims, 8 Drawing Sheets

(51) Int. Cl.
*G01N 21/65* (2006.01)
*G01N 21/17* (2006.01)

(56) References Cited

U.S. PATENT DOCUMENTS

| | | | |
|---|---|---|---|
| 6,331,276 B1* | 12/2001 | Takei | G01N 21/554 |
| | | | 422/82.09 |
| 8,009,356 B1* | 8/2011 | Shaner | G02B 5/008 |
| | | | 359/573 |
| 8,537,457 B1 | 9/2013 | Ptasinski et al. | |
| 8,848,495 B1 | 9/2014 | Wu et al. | |
| 2001/0026943 A1 | 10/2001 | Dickof et al. | |
| 2002/0016011 A1* | 2/2002 | Perkins | G01N 21/553 |
| | | | 436/524 |
| 2005/0112028 A1* | 5/2005 | Ohtsuka | G01N 21/0332 |
| | | | 422/82.11 |
| 2005/0248829 A1* | 11/2005 | Sawin | G02B 6/1226 |
| | | | 359/321 |
| 2005/0248830 A1 | 11/2005 | Sawin et al. | |
| 2006/0134669 A1 | 6/2006 | Casasanta, III | |
| 2007/0188845 A1 | 8/2007 | Xu et al. | |
| 2008/0064035 A1* | 3/2008 | Densham | G01N 33/54373 |
| | | | 435/6.18 |
| 2008/0088845 A1* | 4/2008 | Ke | B82Y 15/00 |
| | | | 356/445 |
| 2011/0037981 A1* | 2/2011 | Zhu | G01N 21/553 |
| | | | 356/369 |
| 2012/0105857 A1* | 5/2012 | Lee | G01N 21/554 |
| | | | 356/445 |
| 2012/0257204 A1* | 10/2012 | Walters | H01L 31/02327 |
| | | | 356/445 |
| 2018/0045861 A1* | 2/2018 | Caldwell | H01L 28/24 |
| 2020/0306757 A1* | 10/2020 | Lee | B01L 3/50273 |

FOREIGN PATENT DOCUMENTS

| | | |
|---|---|---|
| WO | 9822808 | 5/1998 |
| WO | 2011155909 A2 | 12/2011 |
| WO | 2012101539 A1 | 8/2012 |
| WO | 2012138915 A1 | 10/2012 |
| WO | 2019122161 A1 | 6/2019 |
| WO | 2020260288 A1 | 12/2020 |

OTHER PUBLICATIONS

Patents Act 1977: Search Report under Section 17, issued by the UK Intellectual Property Office for Application No. GB 1721611.0, dated Dec. 6, 2018.

International Search Report and Written Opinion for International Application No. PCT/EP2020/067513, entitled "Addressable Plasmonic Arrays," dated Aug. 14, 2020.

* cited by examiner

ADDRESSABLE PLASMONIC ARRAYS

This application is the U.S. National Stage of International Application No. PCT/EP2018/086253, filed Dec. 20, 2018, which designates the U.S., published in English, and claims priority under 35 U.S.C. § 119 or 365(c) to Great Britain Application No. 1721611.0, filed Dec. 21, 2017. The entire teachings of the above applications are incorporated herein by reference.

FIELD

The invention relates to addressable plasmonic arrays. In particular, the invention relates to electronically-addressable arrays of pixels or array elements at which surface plasmons are individually producible addressably and controllably. The invention may be applied to optical devices, such as super-resolution imaging devices.

BACKGROUND

The resolution of a microscope is proportional to the wavelength of the light being observed, and is inversely proportional to the size of the objective lens of the microscope. The observation of sub-wavelength structures with microscopes is difficult due to the existence of the diffraction limit. This states that light with a wavelength $\lambda$, traveling in a medium with refractive index n and converging to a spot with half-angle $\theta$, will make a spot with a radius r given by:

$$r=\lambda/[2n \sin(\theta)]$$

A good approximation for quantifying the resolution of an optical microscope is the value of the 'full width at half maximum' (FWHM) of the 'point spread function' of the microscope. An optical microscope, with high numerical aperture in visible light, usually reaches a resolution in the range ~200 nm to 250 nm. Consequently, ordinary optical microscopes are limited in their ability to resolve objects, by the diffraction limit, and can only resolve objects no smaller than about 200 nm.

However, in order to achieve a higher resolution, one traditionally requires either:
(a) The use of scanning near-field techniques (e.g. Atomic Force Microscopy, AFM: Scanning Tunnelling Microscopy, STM; Scanning Near-field Optical Microscopy, SNOM), in which a small probe (e.g. with dimensions if nm-scale) is brought very close to the surface of a sample, and scanned across its surface while in such close proximity. This is a slow technique due to the requirement of very close proximity of the probe to the sample surface, demanding great care and time;
(b) The use of Scanning Electron Microscopy (SEM) techniques, Transmission Electron Microscopy (TEM) techniques, or scanning ion techniques which utilize the fact that the de Broglie wavelength of charged massive particles (electrons, ions) of high velocity is much smaller that the wavelength of optical light. The result is that the diffraction limit of such particles is many orders below the diffraction limit of light. However, these techniques require the use of vacuum technologies and the expense and limitations they bring;
(c) The use of photons with relatively very short wavelengths (UV, X-rays) which have a significantly smaller diffraction limit than do photons of optical light. These techniques suffer from the difficulties associated with the creation of optical components with the required high Numerical Aperture (NA) for such short wavelengths.

However, all the above mentioned imaging methods are inferior to visible light microscopy in terms of image contrast and speed of image acquisition. The above non-optical methods also suffer from the problem of inducing changes to the sample being imaged (e.g. caused by the presence of a vacuum, or by ionizing irradiation), or the generation of potential physical artefacts in the sample (e.g. caused by close proximity physical scanning techniques).

The imaging of biological, biochemical and medically relevant samples requires spatial resolutions beyond the diffraction limit in order to unravel the mechanisms at the spatial scale of nanometres. Furthermore, biological samples, especially living cells, are best tested in-vivo or at least in-vitro without altering the samples or their mechanisms. Therefore, techniques requiring vacuum conditions (e.g. TEM; SEM; X-ray Photoelectron Spectroscopy, XPS) are not a good choice.

Sub-diffraction limited techniques include:
(a) Stimulated Emission Depletion (STED) microscopy is one of the techniques that make up super-resolution microscopy. It creates images by the selective deactivation of fluorophores (using a ring/donut-shaped laser mode), minimising the area of illumination at the focal point, and thus enhancing the achievable resolution for a given system.
(b) Scanning Near-field Optical Microscopy (SNOM) is the optical variant of Atomic Force Microscopy (AFM) and is using either a scanning optical fibre (with a sub diffraction sized apex) or a vibrating scattering tip Apertureless Scanning Near-Field Optical Microscopy (ASNOM).
(c) Stochastic functional techniques include Photo Activated Localization Microscopy (PALM) and STochastic Optical Reconstruction Microscopy (STORM) as these methods (unlike STED which is deterministic) use mathematical models to reconstruct a sub diffraction limit from many sets of diffraction limited images. Single molecule localization and composition (PALM/STORM) is a nonlinear effect based on the idea that many images can be combined to narrow stochastically the emission point spread function (i.e. reduce noise). Under conditions where all photons are emitted from the same source, a simple fitting procedure on the image, or the determination of the centre of mass, allows a more precise position determination than is possible with the uncertainty of just a single emitted photon, as represented by the width of the emission point spread function.
(d) Structured Illumination is a method which involves using a known illumination pattern which is translated and rotated across the sample surface to extract additional sub-diffraction limited information.

All of the above techniques, except SNOM/ASNOM, require the labelling of samples with a fluorophore, and are either based on model-based reconstruction of a non-sub diffracted limited image, or employ very high laser powers (e.g. STED). SNOM is a comparably slow scanning technique which is very artefact-ridden and it is difficult to obtain results routinely using this technique. Furthermore, all of the above techniques fail to provide routine access to much higher spatial resolutions than e.g. confocal microscopy. Compare typical resolutions: confocal resolution (200 nm); STED (80-100 nm). Better resolutions have only been obtained on rare occasions and in selected (sturdy) samples like vacancies in diamond. All existing techniques are expensive, slow and do not provide video-rate imaging speeds.

The invention aims to address this.

SUMMARY

At its most general, the invention addressably excites a surface plasmon and spatially correlates detected light scattered from the excited surface plasmon, by its interaction with a sample object being imaged, to the spatial address of the plasmon excitation in question and, therefore, to the location of the sample object being imaged (or a part of it). The excitation of surface plasmons may be generated in a number of ways to this end. The following are just some examples of plasmon excitation methods. For clarity, in the following, an addressable location for surface plasmon excitation is referred to as a "pixel", and a surface plasmon may be excited there using any one of the following techniques.

Surface plasmons are coherent electron oscillations that exist at an interface of a material where the real part of the dielectric function changes sign across the interface (e.g. a metal-dielectric interface, such as a metal surface in air). The charge motion in a surface plasmon creates electromagnetic fields which extend outside the metal. The total excitation, comprising both the charge motion and associated electromagnetic field, is sometimes called a surface plasmon polariton at a smooth or planar interface, or a localized surface plasmon when at the surface of a small particle or small salient surface pattern element. In the following, the term 'surface plasmon' is intended to incorporate all types of surface plasmons, including surface plasmon polaritons and localized surface plasmons.

Kretschmann Configuration: Excitation light is coupled to a conductive (e.g. metal) surface via an optically transparent optical coupling block (e.g. a prism) with a surface (typically flat) upon which the conductive surface is disposed. The optical coupling block couples light to the conductive surface via its underside, and surface plasmons may be excited in the conductive surface at its upper side (exposed), this being the surface upon which an imaged sample resides according to the present invention. A prism, such as a glass prism, may be used, however, while a prism shape is convenient, this shape is not essential. The optical coupling block matches the k-vector of the incoming light to the requirements of the surface plasmon resonance. For a given combination of materials (prism, metal layer, and sample object) and a fixed wavelength of excitation light, there exists a distinct angle at which an optimal surface plasmon excitation can be achieved. The fine tuning of this configuration can be achieved by changing the angle of incidence of the excitation light upon the conductive surface, and/or by changing the wavelength of the excitation light used. FIGS. 1 and 2, below, relate to this technique as one example.

Otto Configuration: An earlier variant of the Kretschmann configuration is the Otto configuration whereby the optical coupling block (e.g. prism) and the conductive (e.g. metal) surface are not in direct contact with each other but are separated by a small airgap (of the order of 100 nm).

Grating Excitation Configuration: Excitation light is directed to a conductive (e.g. metal) surface. If the conductive surface has a periodic structure, with a spatial period falling within a range of about 100λ to about λ/100, where λ is the wavelength of excitation light, it can be regarded as an optical diffraction grating structure. Such a structure is also capable of delivering, to electrons on the conductive surface, an additional momentum (k-vector) required for surface plasmon excitation. In this case an optical coupling block (per the Kretschmann technique) is not strictly required and excitation can also be achieved from either side of the conductive surface, including the surface upon which an imaged sample resides according to the present invention. The fine tuning of this configuration can be achieved by changing the angle of incidence of the excitation light upon the conductive surface, and/or by changing the wavelength of the excitation light used. FIGS. 3A, 3B, 5 and 8, below, relate to this technique as examples, and the pixel structure in such examples is typically periodic and can be utilized to achieve excitation.

Localised Plasmonic Excitation Configuration: Small metallic particles (e.g. arranged in an array) or metallic surface patterns can also be made resonant with the incoming excitation light, and can create a localised surface plasmon. Such a surface plasmon is localised in the sense that, in this configuration, it cannot propagate away from the particle or pattern element. The conditions for this excitation are determined by the size and shape of the particle or surface pattern element, in relation to the wavelength of excitation light being used. If, for example, the particles or pattern elements are spherical/circular structures of a given material, then generally speaking the diameter of such a structure is the only parameter which can be varied to implement a tuning of the surface plasmon excitation, for a given wavelength of excitation light. However, if the particles or pattern elements are prolate structures (including nanorods, ellipses), then the relevant tuning parameter is not directly the absolute size or the structure, and surface plasmon excitation tuning depends on the ratio of the long axis to the short axis of the prolate structures (e.g. aspect ratio), instead.

Edge Effect Configuration: The edges of material structures, such as edges of conductive surfaces, present rapidly changing optical constants (e.g. at the edges of the pixels described herein). These edges give also rise to weaker but appreciable and useful surface plasmon excitations. FIGS. 3A, 3B, 5 and 8, below, relate to this technique as examples, and the pixel structure in such examples typically presents such edge effects.

Rough Surface Excitation: A rough conductive surface may excite surface plasmons. In particular, the spatial profile of the rough surface contains spatial 'k-vectors' (as demonstrated via Fourier transformation) which enable matching that of a surface plasmon, then the surface plasmon of that momentum may be excited by incident light directed upon the surface appropriately.

Ionising Particle Beam Configuration: Surface plasmon resonances may be excited by directing ionising particle beams at a conductive (e.g. metal) surface so as to ionise the atoms of that surface. The ionizing beam may comprise electrons, or ions, for this purpose.

Thus, it is to be understood that the generation of surface plasmon resonances on a conductive surface, may be implemented in a number of ways for use in accordance with the invention.

In an aspect of the invention, there is provided an imaging apparatus for imaging a sample comprising an array of electronically addressable pixels wherein each pixel is arranged to support a surface plasmon resonance therein to generate an evanescent electromagnetic field which extends transversely from the pixel so as to be salient from plane of the array for illuminating the sample. An optical detector is arranged for detecting optical radiation scattered from the evanescent electromagnetic field by the sample. A processing unit arranged to associate the detected optical radiation with the address of the pixel or pixels within the array at which the surface plasmon resonance was generated. The imaging apparatus may be arranged to generate surface plasmon resonances at a given pixel of the array according a configuration employing any of: a Kretschmann Configuration; an Otto Configuration; a Grating Excitation Configuration; a Localised Plasmonic Excitation Configuration; an Edge Effect Configuration; a Rough Surface Excitation configuration; an Ionising Particle Beam Configuration. The pixels of the array of pixels are preferably electrically conductive and are able to support surface plasmons on an electrically conductive surface thereof. The surface plasmons may be individually producible separately at each addressed pixel(s) of the array by addressing the array electrically. This may be done by applying an electrical signal applied to it (e.g. a voltage applied to an addressed pixel(s), and/or an electrical current flow through the body of an addressed pixel(s)) or an electrically-induced signal or interaction (e.g. an induction) applied to it. Of course, multiple separate and separated pixels of the array may be addressed simultaneously. Each pixel may be arranged to support a surface plasmon therein in the sense that the particular surface plasmon in question would become no longer supported (e.g. of insufficient strength to be of practical use, or not present at all) if it were to move outside/beyond the pixel (e.g. such as to the location of conductive electrical addressing lines of the array).

The imaging apparatus may comprise a light source arranged to illuminate the array to generate said surface plasmon resonance. The light source may be arranged to illuminate the pixel array with electromagnetic radiation suitable to excite/generate surface plasmon resonances there. The surface plasmon resonance may be generated when the temperature of said pixel is a first temperature value. The temperature of an addressed pixel may be controllably changed by applying an electrical signal to it (e.g. a voltage applied to an addressed pixel(s), and/or an electrical current flow through the body of an addressed pixel(s)) to heat the addressed pixel, or by applying an electrically-controlled heating or interaction to it. If an Ionising Particle Beam Configuration is employed to excite the surface plasmons, in alternative arrangements, then the light source may be replaced with an ionising particle beam source (e.g. electron beam, ion beam). The particle beam source and pixel array may preferably be located within a vacuum chamber in such an arrangement, to permit unimpeded flow of ionising particles in the beam, in use. The light source, or particle beam, may be arranged to illuminate the array in the sense of illuminating a plurality of, or all of, the pixels of the array simultaneously such that a plurality of separate and separated surface plasmons may be generated and supported simultaneously at the plurality of separate and separated pixels of the array that are concurrently addressed electronically. The optical detector is arranged to detect optical radiation scattered directly from the evanescent field (or optical phenomena including fluorescence which have been exited by the evanescent field) of a plasmon by the sample, and therefore the scattered radiation radiates from the scattering site towards the optical detector as a radiating electromagnetic wave as opposed to a non-radiative evanescent field which cannot radiate because it is inherently non-radiative and decays rapidly over short distances.

The processing unit may be arranged to reversibly change said temperature from said first temperature value to a second temperature value sufficiently different to the first temperature value to render said surface plasmon non-resonant (or at least further from resonance) thereby to diminish said evanescent electromagnetic field. In this way, the temperature of a pixel may be used as a control parameter to control the required conditions for resonance at the pixel and, therefore, control the ability of that pixel to support a surface plasmon resonance under current conditions. Accordingly, a controlled change in pixel temperature may be used to switch a selected pixel 'off' or 'on', as desired, in terms of the presence or strength of surface plasmons there.

Desirably, the second temperature value exceeds said first temperature value. The first temperature value may be any temperature value at or below a first temperature threshold, and the second temperature value may be any temperature value exceeding a second temperature threshold. Desirably, the second temperature threshold exceeds the first temperature threshold. Accordingly, a given pixel may be heated, or its temperature increased, in order to cause the pixel to transition from a cooler state which is better able to support a surface plasmon resonance, to a hotter state in which it is less able (or unable) to support a surface plasmon resonance, and vice versa. The cooler state may be considered to be the pixel 'on' state, and the hotter state may be considered to be the pixel 'off' state. In such a configuration, most preferably, the imaging apparatus is arranged such that the mechanism for exciting surface plasmon resonances is arranged to resonantly excite surface plasmon resonances when a given pixel is at the first temperature (or at least be closer to resonance than when the pixel is at the second temperature). This configuration is possible when the strength of coupling of the excitation mechanism (e.g. light) to surface plasmons is stronger at the lower temperature (e.g. on-resonance) than is the strength of such coupling at the higher temperature. It has been found that lower temperatures result in a stronger difference/contrast in the strength of coupling to surface plasmon resonances as between the resonant (or near-resonant) condition at the first (lower) temperature, and the non-resonant (or less near to resonant) condition at the second (higher) temperature. It is believed that the heating of a pixel changes the complex optical constants of the material(s) (thermal expansion, noise etc.) which may interfere with surface plasmon generation and, as a result, this reduces the coupling strength between the excitation mechanism (e.g. light) and the electrons at the conductive surface from which plasmons are to be generated.

Nevertheless, in alternative embodiments, the first temperature value may exceed the second temperature value. The first temperature value may be any temperature value at or above a first temperature threshold, and the second temperature value may be any temperature value below a second temperature threshold. Desirably, the first temperature threshold exceeds the second temperature threshold. In particular, in such a configuration, the imaging apparatus may be arranged such that the mechanism for exciting surface plasmon resonances is arranged to resonantly excite surface plasmon resonances when a given pixel is at the first temperature (or at least be closer to resonance than when the pixel is at the second temperature). This may result in a sufficient difference/contrast in the strength of coupling to surface plasmon resonances as between the resonant (or near-resonant) condition at the first temperature, and the non-resonant (or less near to resonant) condition at the second temperature. Accordingly, a given pixel may be heated, or its temperature increased, in order to cause the pixel to transition from a cooler state which is less able to support a surface plasmon resonance, to a hotter state in which it is more able to support a surface plasmon resonance, and vice versa. The cooler state may be considered to be the pixel 'off' state, and the hotter state may be considered to be the pixel 'on' state. This configuration is possible when the strength of coupling of the excitation mechanism (e.g. light) to surface plasmons is stronger at the higher temperature (e.g. on-resonance) than is the strength of such coupling at the lower temperature.

The processing unit may be arranged to implement the reversible change of the temperature of an addressed pixel, from the first temperature value to the second temperature, either directly or indirectly. Indirect heating may be via a process of conductive, inductive and/or radiative heating whereby each pixel is provided with a dedicated heating element disposed adjacent to it, and in thermal communication with it. The heating elements may form an array of heating elements in a spatial distribution which substantially matches that of the array of pixels. Preferably, each heating element of the array of heating elements is spatially disposed in register with one corresponding pixel element to which it is dedicated. Thus, an address of a dedicated heating element may correspond with the address of an associated pixel. The processing unit may be arranged to address a given pixel by addressing its associated heating element to cause that heating element to heat-up and to conduct and/or radiate heat (e.g. infra-red (IR) light) to the addressed pixel with which it is in register. A heating element and its associated pixel may be electrically separated and isolated from each other e.g. via an intervening electrically insulating material between them, such as a dielectric material. The dielectric material may be optically transparent (e.g. in the IR spectrum) to permit radiative heat transfer from the heating element to the associated pixel. Preferably, each heating element is in physical contact with the intervening material, and likewise its associated pixel, and preferably the intervening material provides a bridge of thermally conductive material(s) (e.g. continuous bridge) to facilitate effective heat conduction. Direct heating may be performed electrically, using ohmic/joule heating of a pixel resulting from passing an electrical current into, through, or along the pixel.

Desirably, a said pixel comprises a portion of an electrically conductive line which may be of lower cross-sectional area than adjacent parts of the electrically conductive line either side of the pixel along the electrically conductive line. Accordingly, a pixel may be defined by a construction in a conductive path which results in a higher current density at that part of the path, when a potential difference is applied to opposite ends of the path. The increased current density produces an ohmic/Joule heating effect at the pixel. A pixel may comprise a portion of an electrically conductive line which may be of lesser width and/or thickness than adjacent parts of the electrically conductive line either side of the pixel along the electrically conductive line.

The array of pixels may comprise a plurality of separate first conductive lines each defining an addressable row in the array, wherein each first conductive line is crossed by at least one of a plurality of second conductive lines each defining an addressable column in the array. A pixel may be defined or located in a part of a first conductive line located between successive second conductive lines. Preferably, first and second conductive lines are electrically connected where (or next to where) they cross. Optionally, a first conductive line may be crossed by a plurality of second conductive lines. A pixel may be defined or located within a part of a first conductive line located between those parts thereof crossed by successive second conductive lines.

The processing unit may be arranged to apply an electrical potential(s) to an end, or each end, of a given first conductive line and/or a given second conductive line. The application of an electrical potential(s) may be controlled so as to minimise or prevent a difference in electrical potential between such ends (e.g. no net electrical voltage). The application of an electrical potential(s) may be controlled so as to change the electrical potential(s) applied to an end, or each end, of a conductive line thereby to provide a voltage between such ends. Desirably, a pixel may be addressed by controlling the electrical potential applied at an end, or each end, of at least one of the first conductive line and the second conductive line associated with the addressed pixel of the array.

Thus, for example, a selected pixel may be addressed (e.g. controlled to be 'on' or 'off' as desired) by appropriately controlling the application of electrical potential(s) to the first and second conductive lines of the array which collectively share the 'row-and-column' coordinate address of the pixel within the array. The application of an electrical potential(s) may be controlled so as to generate a voltage across an addressed pixel thereby allowing a current to flow through the addressed pixel. For example, this may be employed when current is used to heat a pixel to switch it from a more resonant 'on' state (when cooler) to a less resonant (or non-resonant) 'off' state (when heated), as described above. Alternatively, the application of an electrical potential(s) may be controlled so as to minimise or prevent a voltage across an addressed pixel. For example, this may be employed when a reduction or removal of current is used to cool a pixel to switch it from a more resonant 'on' state (when heated by current flow) to a less resonant (or non-resonant) 'off' state (when cooler, with lesser or no current flow), as described above.

A pixel may form a conductive bridge between a given first conductive line and a given second conductive line to permit a flow of current between the given first conductive line and the given second conductive line via the pixel. A given first conductive line may be electrically connected (e.g. directly, or physically) to a given second conducting line only via one or more such conductive bridges. This means that for current to flow from a given first conductive line and a given second conductive line, it must flow via a pixel joining the two conductive lines in question. An electrical insulating material may separate each of the first conductive lines from each of the second conductive lines where they overlap, to prevent electrical connection there.

Desirably, the pixel array may be formed by two overlapping arrays of conductive lines spaced apart from one another wherein a pixel is defined where one conductive line of one of the two arrays overlaps a conductive line of the other of the two arrays. The conductive lines of one or each of the overlapping arrays may be parallel. This may be conducive to a regular pixel array pattern. Alternatively, the conductive lines of one or each of the overlapping arrays may be other than parallel, such a first array comprising separate conductive lines radiating outwardly from a common focus, and the second array comprising one or more looped conductive lines (e.g. circular) which may be concentric loops centred on the common focus of the first array. Here a pixel is defined where a radial line overlaps a loop. The conductive lines within each array may be of substantially uniform width and/or thickness along their respective lengths. This means that deliberate constrictions in the cross-sectional area of a conductive line within an array may be unnecessary, as it may be unnecessary to localise the position of a surface plasmon resonance along the conductive line. This permits a surface plasmon to extent or to propagate along a length of a conductive line, within one array, which is overlapped by a plurality of the conductive lines of the other array of the two overlapping arrays. Preferably, the two arrays are not electrically in contact or connection, such that a conductive line of either one of the two arrays is electrically addressable independently of the other. The addressing of a conductive line may comprise applying an electrical potential difference along the conductive line. This may preferably cause a current to flow along the conductive line, to heat it ohmically (a.k.a. Joule heating).

Accordingly, a surface plasmon excitation may be generated on a selected conductive line of one of the two arrays. Subsequently, a surface plasmon excitation may be generated on a selected conductive line of the other of the two arrays. If an imaged object (or a part of it) is present at a location along any part of the addressed conductive line of the first array, then a signal of light may be scattered from the surface plasmon upon that line as it interacts with the object, and this may be detected. Subsequently, if that imaged object (or a part of it) is present at a location along any part of the addressed conductive line of the second array, then a signal of light may be scattered from surface plasmon upon that line as it interacts with the object. Again, this may be detected. If scattered light is detected when the conductive line of the first array is addressed in this way, and is detected when the conductive line of the first array is addressed, then this means that the imaged object (or a part of it) must be present where both of the two conductive lines are present within the filed of view of the optical detector (e.g. a plane to which both arrays may be parallel)—that is the location where the two conductive lines are seen to cross, within the field of view of the optical detector.

The two overlapping arrays of conductive lines (e.g. parallel) may be spaced apart from one another by an intervening layer of dielectric material (e.g. a glass). The intervening dielectric layer may be optically transparent. This maintains a desired separation between the two arrays without impeding the generation of surface plasmons in each (e.g. via an incident optical excitation light). The spacing between the two arrays may be of the order of 50 nm or 100 nm (e.g. between 50 nm and 200 nm), and may be a substantially uniform spacing as between the two arrays at any opposing parts thereof.

A pixel, or each pixel, or an/each conductive line of the array, may comprise a metal. The metal may be a metal selected from: Gold, Silver, Copper, Aluminium, Magnesium. The choice of metal may depend on the wavelength of the excitation light employed to excite a surface plasmon upon the metal. For example, Aluminium and Magnesium are more effective at generating surface plasmons when the excitation light is blue or ultraviolet (UV) light. Conductive lines or the array, or pixels of the array, or conductive lines of the array comprising pixels of the array, may desirably be disposed upon a surface of a dielectric material. The dielectric material may desirably be optically transparent. The dielectric material may desirably be a glass, or a plastic.

When the imaging apparatus comprises a light source arranged to illuminate the pixel array with excitation electromagnetic radiation to generate surface plasmon resonances there, the excitation electromagnetic radiation may have a wavelength range in any suitable wavelength of interest. Suitable wavelengths may be in one of the following electromagnetic wavelength ranges: radio-frequency (RF), microwave, infra-red (IR), near-infrared (NIR), visible, ultraviolet (UV). It is desirable to enhance the achievable contrast for imaging using the scattered light that is radiated from surface plasmons when they interact with the sample at a pixel. Preferably, the wavelength of the excitation light is a wavelength which produces the greatest change in the electric field in the optical near-field generated at the addressed pixel(s) for a given (e.g. minimal) change in electrical current applied to the addressed pixel(s). Such a wavelength of excitation light may be a wavelength at or close to the plasma edge of the chosen material (e.g. metallic material) of the pixel(s). This edge is well-known as being identifiable in the reflection spectrum excitation light reflected from the pixel(s) and occurs where the reflectivity starts to drop quickly when the excitation wavelength becomes shorter. This is a result of the limited mobility of the electrons in the material (e.g. metal) of the reflecting pixel. The plasma edge is found for gold at wavelengths in the range 500 nm to 580 nm and for silver it is found at wavelengths in the range between 300 nm and 380 nm. Other metals have their plasma edge further in the UV (e.g. Al, Mg) or shifted to longer wavelength (e.g. Cu). Furthermore, metallic alloys (e.g. a binary gold-silver alloy) may be used as the material of the pixels in order to select/tune the plasma edge wavelength between those of the pure elements that the alloy is made of.

The imaging apparatus may be configured to generate a surface plasmons at a pixel with an evanescent field which extends to a height of at least 10 nm, or at least 20 nm above the surface of a pixel whereat the electric field strength thereof (e.g. absolute field strength) is to not less than 1/e (e=2.71828 . . . ) of its value as at the pixel surface. Preferably, this height may be at least 30 nm, or at least 50 nm, or at least 100 nm, or at least 200 nm. This height may be a height within the range 25 nm to 50 nm, for example, or may be a height within the range 75 nm to 125 nm. The magnitude of the evanescent filed decays exponentially with perpendicular distance away from the surface supporting it. Different materials (e.g. metals) are more effective than others in supporting stronger surface plasmons having a larger 1/e decay length/height. For example, the 1/e decay height of surface plasmons on a Gold or Silver surface may be, in preferred embodiments, between about 75 nm and about 125 nm. However, in other preferred embodiments, wherein Magnesium or Aluminium is used as the material of the pixels, instead of the Gold or Silver, the 1/e decay height of surface plasmons on the pixel surface may be between about 25 nm and about 50 nm. The invention, in preferred embodiments, is able to induce large changes in the electric field strength of an evanescent field of a generated surface plasmon, which are several orders of magnitude greater than could be induced randomly by ambient natural phenomena.

A pixel of the array, or each pixel of the array, may be dimensioned such that the greatest dimension thereof (length, or width) does not exceed 500 μm, or preferably does not exceed 250 μm, or preferably does not exceed 100 μm, or preferably does not exceed 50 μm, or preferably does not exceed 25 μm, or preferably does not exceed 10 μm, or preferably does not exceed 500 nm, or preferably does not exceed 250 nm, or preferably does not exceed 100 nm, or preferably does not exceed 75 nm, or preferably does not exceed 50 nm, or preferably does not exceed 30 nm, or preferably does not exceed 10 nm, or preferably does not exceed 1 nm. A pixel of the array, or each pixel of the array, may be dimensioned such that the greatest dimension thereof (length, or width) does not exceed the value of the wavelength of the illumination light generated for illuminating the array to generate surface plasmons.

Desirably, the pixel array comprises at least 9 pixels (e.g. a 3×3 array), or at least 20 pixels, or at least 50 pixels, or at least 100 pixels, or at least 500 pixels, or at least 1000 pixels, or at least 5000 pixels, or at least one million pixels. The pixel array may comprise a rectangular (e.g. square, or otherwise) array of pixels numbering at least 10 pixels on each side (e.g. 10(at least)×10(at least), or at least 100 pixels on each side (e.g. 100(at least)×100(at least), or at least 1000 pixels on each side (e.g. 1000(at least)×1000(at least). The pixel array may be substantially planar. The pixel array may be disposed upon a substantially planar surface (e.g. a dielectric surface). The pixel array may be exposed to the ambient environment, for receiving a sample (to be imaged) directly thereupon, or may be covered by a protective covering (e.g. a dielectric material), which is preferably optically transparent, such as a glass or plastic protective covering.

The light source may be configured for outputting illumination light with which to illuminate the array at a controllably adjustable angle of incidence thereupon. The processing unit may be arranged to vary the angle of incidence whilst the light source illuminates the array, to determine the angle of incidence at which the detected optical radiation associated with an addressed pixel is maximised.

The optical detector may comprise a photodetector responsive to light scattered from the evanescent electromagnetic field of a surface plasmon generated upon the array by the light source. The optical detector may comprise an optical focusing part(s) arranged to focus upon the photodetector light which is scattered from the evanescent electromagnetic field of a surface plasmon generated upon the array by the light source. The light source may comprise a laser for outputting the illumination light.

The imaging apparatus may comprise said array of pixels disposed over (e.g. upon) a surface of an optical coupling block, whereby the light source is arranged to illuminate the array of pixels via transmission of illumination light through the optical coupling block. The imaging apparatus may comprise the pixel array and the optical coupling block configured in a Kretschmann configuration, or an Otto configuration. The light source may be arranged to direct the illumination light an an internal angle of incidence to the surface of the optical coupling block, within the optical coupling block, to achieve total internal reflection (TIR) thereat. The imaging apparatus may comprise a second optical detector arranged to receive illumination light reflected (e.g. by TIR) from the internal surface of the optical coupling block, and the processing unit may be arranged to vary the angle of incidence of the illumination light whilst the light source illuminates the array, to determine the angle of incidence at which the intensity of reflected illumination light is minimised. In this way, the second optical detector may be used to identify, and fine-tune, the angle of incidence of illumination light required to achieve the strongest coupling of the illumination light to surface plasmons—i.e. the intensity of reflected illumination light is minimised, since a maximal amount of energy is coupled from the illumination light to the electrons at the surface of the pixel array to generate surface plasmons resonantly. Additionally, subsequent to the resonance fine-tuning, when in normal operation, the second optical detector may be used to yield reflection-dependent optical constants as independent information about the sample at the same spatial resolution as the first optical detector.

The invention may be operated/used in the ambient atmospheric environment. It may be used without labelling of molecules. However, if labelling of molecules is used, then the generated surface plasmons of the invention can be used to excite the labelled molecules and further increase the intensity of detected light scattered from a surface plasmon due to its interaction with a sample (i.e. the labelled molecules within the sample) The invention may be used with low laser powers (or other light sources, including LEDs). It is easy to integrate into existing optical microscopes, and requires relatively low cost. The imaging method is a fast technique which will allow for video rate (or faster) imaging of nano-scale processes.

Optionally, an optically transparent dielectric cover layer may be disposed over the top of the pixel array(s) as a protective layer. In some embodiments, this may result in the pixel layer being sandwiched between two dielectric layers collectively acting as a waveguide. This may assist in coupling excitation light to the pixel array to more efficiently generate surface plasmons there.

In another aspect of the invention, there is provided an imaging method for imaging a sample comprising: providing an array of electronically addressable pixels wherein each pixel is arranged to support a surface plasmon resonance therein to generate an evanescent electromagnetic field which extends transversely from the pixel so as to be salient from plane of the array for illuminating the sample; electronically addressing a said pixel(s); detecting optical radiation scattered from the evanescent electromagnetic field by the sample; associating the detected optical radiation with the address of the pixel or pixels within the array at which the surface plasmon resonance was generated.

The method may comprise illuminating the array to generate said surface plasmon resonance when the temperature of said pixel is a first temperature value; reversibly changing said temperature from said first temperature value to a second temperature value sufficiently different to the first temperature value to render said surface plasmon non-resonant or further from resonance thereby to diminish said evanescent electromagnetic field. The second temperature value may exceed the first temperature value.

A pixel may comprise a portion of an electrically conductive line which is of lower cross-sectional area than adjacent parts of the electrically conductive line either side of the pixel along the electrically conductive line. The pixel array may be formed by two overlapping arrays of conductive lines spaced apart from one another wherein a pixel forms a conductive bridge electrically connecting a conductive line of one of the two arrays to a conductive line of the other of the two arrays. The conductive lines of/within one or each array may be parallel. The pixel array may be formed by two overlapping arrays of conductive lines spaced apart from one another wherein a pixel is defined where one conductive line of one of the two arrays overlaps a conductive line of the other of the two arrays. The conductive lines of one or each of the overlapping arrays may be parallel. Alternatively, the conductive lines of one or each of the overlapping arrays may be other than parallel, such a first array comprising separate conductive lines radiating outwardly from a common focus, and the second array comprising one or more looped conductive lines (e.g. circular) which may be concentric loops centred on the common focus of the first array. Thus, a pixel may be defined where a radial line overlaps a loop.

The method may be implemented using the apparatus described above.

DESCRIPTION OF EMBODIMENTS

Figure 1:
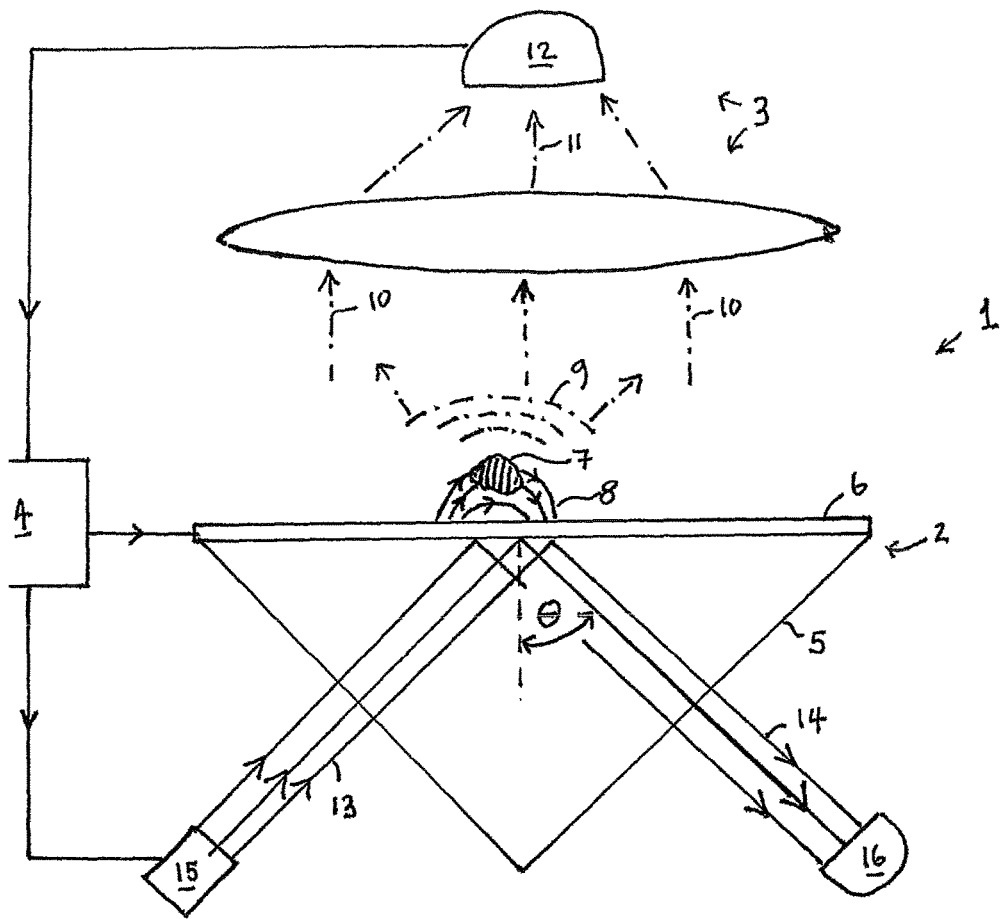
FIG. 1 schematically illustrates an imaging apparatus according to an embodiment of the invention.

In the drawings like items are assigned like reference symbols, for consistency.

Referring to FIG. 1, there is shown schematically, an example of an imaging apparatus (1) for imaging a sample (7), such as a biological sample. The imaging apparatus includes a Kretschmann-type prism (2) comprising an optical prism block (5) upon one planar surface of which is formed and planar array (6) of electronically addressable pixels. Each pixel of the array is arranged to support a surface plasmon upon its surface, and in doing so generate an evanescent electromagnetic field (8) which extends transversely from the pixel so as to be salient, or standing proud, from the plane of the array of pixels.

A light source (15), such as a laser or a light-emitting diode (LED), is arranged to direct optical radiation (13) into the optical prism block (5) towards the underside of the array (6) of pixels at the interface between the array and the surface of the optical prism block supporting it. Specular reflection occurs at the interface resulting in deflection of the incident optical radiation at an angle (θ) of reflection matching the angle of incidence, measured relative to the direction normal/perpendicular to the reflecting surface. The reflected radiation (14) is directed towards, and collected by, a resonance detector unit (16) which detects the intensity of reflected radiation emanating from the reflecting surface.

The light source (15) is arranged so that it uniformly illuminates the entire back surface of the pixel array (6). For example, the light emitted by the light source, the light is collimated by an optical system such as a condenser system (e.g. collimating lens or lenses), such as used in existing 'brightfield' microscope systems. Of course, the condenser system when applied to the present embodiment, is arranged to direct the collimated optical radiation (13) at an oblique angle of incidence and, therefore, the optical axis of the condenser system is tilted relative to the underside of the array (6) of pixels. If a high-quality laser is used as the light source, then it may typically provide a light output sufficiently collimated without the need for additional collimation. The area of the underside of the prism block surface which is illuminated in this way may typically be significantly smaller than the entire prism back surface area.

It is to be understood that the resonance detector unit (16) is present in the embodiment described here as a preferred feature, but may be dispensed with in other embodiments (discussed below). For example, in the present embodiment, if the resonance angle of incidence of optical radiation upon the pixel array required to resonantly excite surface plasmons (SP) is already known, then the light source (15) may be fixed at this angular position within the structure of the apparatus in use, or during manufacture. However, in present embodiment of the invention as illustrated in FIG. 1, the resonance detector unit (16) is present for detecting the resonance angle to allow optimisation of that angle and, therefore of the degree of coupling to SPPs. The resonance angle detector (16) helps to find the best angle for optimisation, as the optimum angle depends not only upon the refractive indices of the prism block and pixel array materials, respectively, but also depends to some extent upon the mean/average refractive index of the sample. The angular position of the light source (15) is shared by the angular position of the light source (15), by specular reflection symmetry. Alternatively, one could seek the angular position of the light source (15) at which the maximum optical emission (10) from the sample takes place, in order to optimise the configuration of the system, and such a configuration would include the ability to change the angular position of the light source relative to the pixel array, but would not require the use of the reflectivity detector (16). However, it has been found that using the value of reflectivity, via the reflectivity detector (16) is the easier (high contrast) choice.

Figure 2:
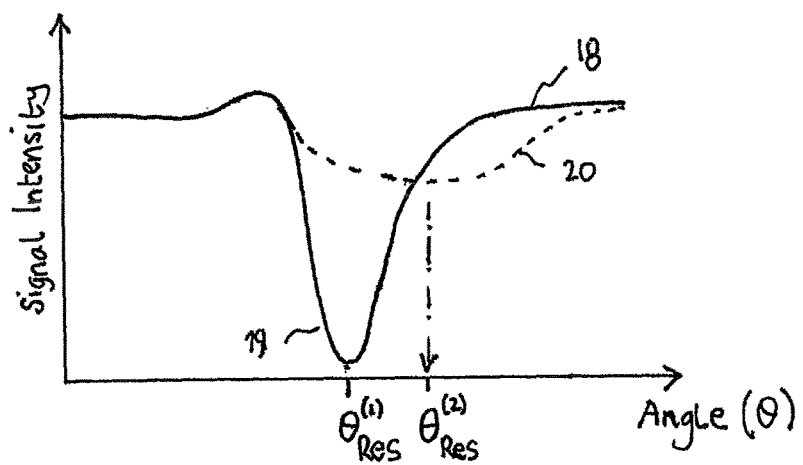
FIG. 2 schematically illustrates resonance profiles in a reflected optical signal intensity (the reflectivity or reflected intensity) as a function of the angle of incidence of optical radiation in the imaging apparatus of FIG. 1.

A resonance occurs in the intensity of reflected optical radiation (14) when the angle of incidence/reflection (θ) acquires a value at which the component of the wave vector of incident light (13) parallel to the plane of the pixel array (6), matches the value of the wave vector of surface plasmons excitable in the pixels of the pixel array. The pixel array may be formed of any metal, however silver or gold are preferred (in the visible part of the optical spectrum) aluminium or magnesium in the UV. The incoming light excites (couples to) surface plasmons which generate a traveling evanescent electrical field (the surface plasmon) at the metallic surface of the pixel in question. This strong coupling results in a dramatic reduction (19) in the intensity of reflected optical radiation which is schematically illustrated in FIG. 2. The dramatic drop in reflected intensity occurs at a resonance angle $\theta_{Res}^{(1)}$, and is of relatively narrow width such that deviation from the resonance angle causes the reflected optical intensity to quickly resume a non-resonant value (18).

The inventors have discovered that the depth, width and position of this resonance is a variable by varying the temperature of the pixel within which the surface plasmon resonance occurs. This is schematically illustrated in FIG. 2 whereby the sharp and deep resonance profile (19) centred at a resonance angle, $\theta_{res}^{(1)}$, occurs at a first pixel temperature ($T_1$). However, a different resonance profile (20) is produced, which is broader and shallower, when the temperature of the pixel is raised to a second pixel temperature ($T_2$) which exceeds the first pixel temperature. This is believed to be due to thermal excitation of the electrons forming the surface plasmon. The angular position of the second resonance profile angle, $\theta_{res}^{(2)}$, is significantly different to (larger than) that of the first resonance profile (19). As will be explained in more detail below, this property is exploited to enable individual pixels of the array to be addressed electronically.

In principle one may provide the apparatus of FIG. 1 arranged in one of two arrangements. In a first arrangement, the light source (15) may be disposed so that the angle of incidence of illuminating optical radiation (13) is substantially coincident with the resonance angle, $\theta_{res}^{(1)}$. In a second arrangement, the light source (15) may be disposed so that the angle of incidence of illuminating optical radiation (13) is substantially coincident with the angular position of the second resonance profile angle, $\theta_{res}^{(2)}$. In the first arrangement, as defined above, the system (pixel) is in resonance ("on" state) at temperature $T_1$. Raising its temperature to $T_2$ reduces or removes the resonance condition and the pixel will be in an "off" state. When the pixel is not so heated, or cools, it resonantly couples to incident light and is in the "on" state again. In the second arrangement, when the pixel is not actively heated and has a temperature $T_1$, the pixel is in an "off" state. By actively heating the pixel, it is made resonant and is rendered in the "on" state. The first arrangement is preferred due to the sharp and deep resonance profile (19) which permits a higher degree of contrast in SPP coupling strengths between the pixel "on" and "off" states, as compared to the second arrangement.

The evanescent electromagnetic field (8) extends a sufficient distance from the array of pixels to illuminate the biological sample (7). The interaction of the evanescent electromagnetic field (8) with the biological sample causes optical (9) radiation to scatter from the sample. In alternative embodiments, the interaction of the evanescent electromagnetic field (8) with the biological sample may excite fluorophores placed/labelled within the sample. It is not necessary to label samples with fluorophores, but labelling enhances image contrast and is therefore of interest as an alternative. At a distance from the array of pixels (6), some of the scattered optical radiation (10) is gathered by an optical detector unit comprising an objective lens (3) and an optical detector unit (12). Scattered optical radiation (11) collected by the objective lens (3) is focused upon the light-sensitive elements of the optical detector unit (12) which is responsive to the focused light to generate an electrical signal for input to a processing unit (4). It is to be understood that the objective lens (3) is presently illustrated as a single lens element for simplicity. However, other embodiments of the invention may employ optical trains comprising more than one lens element and may employ reflecting optical elements, as desired to appropriately direct light and/or to appropriately manipulate light for detection.

The processing unit (4) is arranged to selectively electronically address individual pixels, or groups of pixels, of the array of electronically addressable pixels (6) so as to cause the addressed pixels to generate (or annihilate) surface plasmons therein, and associated salient evanescent electromagnetic fields (8). The processing unit (4) is also arranged to await a consequential electrical signal input from the optical detector unit (12) generated in response to having optically addressed one or more of the pixels of the pixel array (6).

The processing unit is arranged to associate the received electrical signal, which is generated in response to detection of an optical signal emanating from the pixel array (6), with the array address of the pixel or pixels that had been addressed by the processing unit (4). Because the precise location and position upon the pixel array of each addressed pixel is known, therefore the position of the sample (7) responsible for the scattering of light (9, 10, 11) subsequently received by the optical detector unit (12), is also known, by direct association. As a result, the resolution achievable by the imaging apparatus (1) is limited only by the physical size of individual pixels (and their evanescent electromagnetic field) addressable within the pixel array (6). If the sample extends across a group of multiple pixels, then the shape of the group of pixels will follow the corresponding shape of the sample projected onto the plane of the pixel array. Consequently, by addressing a succession of pixels of the pixel array, one after the other, across the array, the processing unit (4) of the apparatus is able to build up a "picture" of the projected shape of the sample on a pixel-by-pixel basis.

It is also possible that different amounts of light may be scattered by different parts of a sample which are adjacent different pixels in the group of pixels, so that the different intensities of the light signal detected by the optical detector unit (12) gives a picture of a property of the sample. For example, less dense regions of a sample scatter less light than more dense regions, meaning that the detected intensity pixel map may be a measure of optical density variation in the sample. The angular position of the reflectivity detector (16), and concurrently the same angle of the light source (15) by specular reflection symmetry, may be varied and corresponding variations in the intensity of light may be concurrently detected by the optical detector unit (12), in order to measure the spatially distributed local refractive index n within the sample. This is because the precise angular position of the light source, at which resonant SPP coupling occurs, is dependent upon the mean/average refractive index of the sample. Maximum SPP coupling will occur at the particular resonance angle of incidence corresponding to a local region of the sample possessing the necessary refractive index associated with that resonance angle. As a result, that local region will be seen as brighter, by the optical detector unit (12), as compared to other local regions of the sample not sharing the same refractive index. Those other local regions will be seen as brighter, by the optical detector unit (12), when the angular position of the reflectivity detector (16) is changed to correspond with the resonant angle of incidence associated with the refractive index of that other region. Thus, scanning through a range of angular positions of the light source (15) and concurrently the same angle of the light source (15) by specular reflection symmetry, one may scan the spatial distribution of refractive index variation within the material of the sample.

Figure 3:
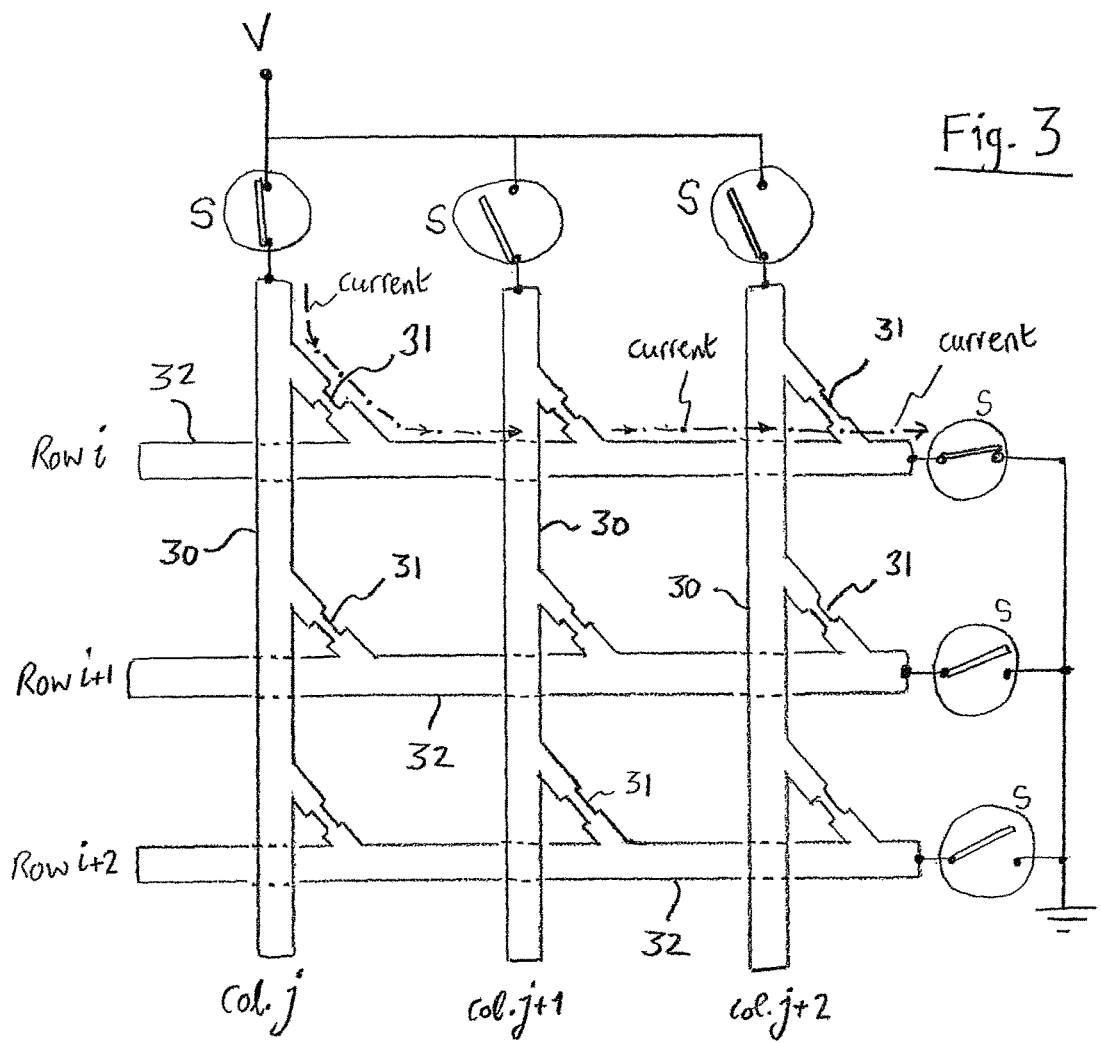
FIG. 3 schematically illustrates an array of electronically addressable pixels within the imaging apparatus of FIG. 1.

FIG. 3 schematically illustrates an example of the array (6) of electronically addressable pixels of the apparatus of FIG. 1. The array comprises a plurality of parallel first conductive lines (30) comprising any suitable metal, preferably gold or silver, each defining an addressing column (col.[j]; col.[j+1]; col.[j+2], etc.) of the pixel array. The array also comprises a plurality of parallel second conductive lines

(32) passing transversely across the first conductive lines (30). The second conductive lines comprise any suitable metal, preferably gold or silver, and each defines an addressing row (row[i]; row[i+1]; row[i+2], etc.) of the pixel array.

A plurality of pixels (31) are formed at regular intervals along each of the first conductive lines. Each pixel forms a conductive bridge between a given first conductive line and a given second conductive line to permit a flow of current between the given first conductive line and the given second conductive line via the pixel. A given first conductive line is electrically connected (directly, and physically) to a given second conducting line only via the pixel conductive bridges along the line. An electrical insulating material separates each of the first conductive lines from each of the second conductive lines where they overlap, to prevent electrical connection there. This means that for a current to flow from a given first conductive line and a given second conductive line, it must flow via a pixel joining the two conductive lines in question. At an end of each conductive line, the line in question is connected to a predetermined electrical potential or voltage via a switch unit 'S', which is operable to electrically isolate the given conductive line from the predetermined potential/voltage when in the 'open' state, and to electrically connect the given conductive line to the predetermined potential/voltage when in the 'closed' state. Each of the switching units is controlled by the control unit (4) to change between an 'open' state' and a 'closed' in order to address a selected pixel, as will be explained below.

The pixels (31) each consist simply of a narrowing of the cross-sectional area of the conductive line over a distance along the conductive line corresponding to the dimension of the pixel in that direction. The narrowing of cross-sectional area is achieved by narrowing the conductive track in two of its three dimensions: namely in a first dimension transverse to the conductive track but lying within the plane of the pixel array; and concurrently in a second dimension perpendicular to both the conductive track and the plane pixel array. The transverse direction of the pixel simply the width of the conductive line in question.

Figure 4:
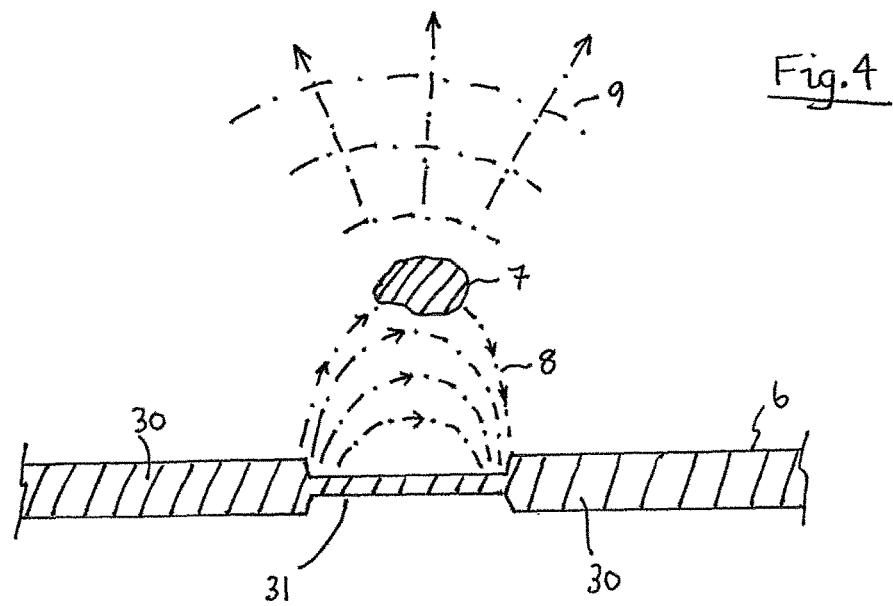
FIG. 4 schematically illustrates an evanescent electromagnetic field generated by surface plasmon resonances supported by an electronically addressable pixel within the array illustrated in FIG. 3.

FIG. 4 illustrates, schematically, the cross-sectional view of a conductive line (30) illustrated a narrowing of the thickness of the conductive line at a pixel (31) in the second dimension perpendicular to the plane of the pixel array, and the conductive line (30) in question. This figure also schematically illustrates the evanescent electromagnetic field (8) supported by the surface plasmon generated in the pixel, which eliminates a sample (7) allowing the sample to scatter optical radiation (9) collectable by the objective lens (3) of FIG. 1, as described above.

An individual pixel (31) may be addressed within this array, by applying an electrical potential (e.g. voltage 'V') to an end of any one of the first conductive lines (30), while concurrently applying an electrical potential (e.g. V=Ground) to an end of any one of the second conductive lines (32). This is schematically illustrated in FIG. 3 by the connection of a first conductive track representing column 'j' of the array, to an electrical voltage 'V' by operation of a switch 'S' connecting an end of the conductive line to an electrical contact held at voltage level 'V'. Concurrently, an end of a second conductive track representing row 'i' of the array, is connected to a 'Grounded' electrical potential by operation of a switch 'S' connecting an end of the second conductive line to an electrical contact held at the Ground level. As a result of these connections, a current path is formed which permits a flow of electrical current between the closed switch of column 'j' and the closed switch of row 'I', via the pixel element (31) which bridges row 'I' and column 'j'. Consequently, the pixel at array address (i,j) is addressed. The flow of current through the pixel causes the pixel to be ohmically heated (a.k.a. Joule heating) with the consequential change in surface plasmon resonance properties induced.

Due to the narrowing of the dimensions of the conductive track at the location of the pixel, current conducted through the pixel has a higher current density than in other parts of the conductive track thereby causing a heating of the conductive track locally at the pixel through which current is caused to flow. However, when conditions are controlled such that no electrical current flows through the pixel, then the temperature of the pixel falls. Referring again to FIG. 2, when a current is caused to flow through a pixel, and the pixel is consequentially heated, the resonance profile is represented by the broad and shallow profile (20) illustrated in FIG. 2. Conversely, when current is prevented from flowing through the pixel, and the pixel is consequentially allowed to cool, the resonance profile associated with the cooler pixel is represented by the narrower and deeper resonance profile (19) illustrated in FIG. 2.

The switches 'S' connecting all other rows and columns of the array (i.e. other than row 'i' and column 'j') are not operated and are left open such that the potential difference between the ends of such rows and columns, is substantially zero and, therefore, a flow of electrical current between such ends is inhibited. When the two electrical potentials are substantially the same, then substantially no potential difference (voltage) is generated across the addressed pixel, thereby inhibiting or preventing a flow of current through the pixel. Conversely, when the 2 applied electrical potentials differ, then a voltage is generated across the pixel thereby permitting a flow of current through the pixel.

Thus, a pixel of the pixel array is addressed by the processing unit (4) of the apparatus of FIG. 1, so as to be switched "on" to generate the salient evanescent electromagnetic field (8), when electrical current is prevented from flowing through the addressed pixel which is thereby permitted to cool and achieve a strong resonance profile (19). The processing unit (4) is arranged, in use of the apparatus (1), to maintain all of the non-addressed pixels of the pixel array (6) in an "off" state in which current is permitted to flow through them thereby to maintain them in a relatively heated state associated with the shallow and broad resonance profile (20) of FIG. 2.

The condition that a pixel is in the "on" when no current flows, but in the "off" state when current is caused to flow, results from the initially chosen resonance angular position of incident optical radiation. In this example, the optical radiation (13) angle of incidence is chosen to be resonant when no current flows (profile 19 of FIG. 2). The pixels are "on" when there is no current/heating but "off" when there is current/heating. Alternatively, if one chooses the incoming angle of optical radiation (13) to be resonant when current does flow (profile 20 of FIG. 2), then the pixels are "on" when current/heating flows but "off" when current does not flow.

In the present embodiment, in the "off" state, when a pixel is heated, the resonance angle of the associated resonance profile (20) is at a different angular position. However, the angle of incidence of optical radiation (13) employed to illuminate the pixel array (6) is fixed in the apparatus of FIG. 1, and so a surface plasmon resonance is not achieved when the pixel is heated. Consequently, the evanescent field of the surface plasmon, being non-resonant, is very much smaller and less pronounced than it would be when the pixel is switched "on". This diminished evanescent field is ineffective in extending out from the pixel towards the sample (7) which, as a result, is not bathed by a strong evanescent field (8) and cannot efficiently scatter optical radiation (9) towards the objective lens (3) of the optical detector unit of the apparatus.

Figure 5:
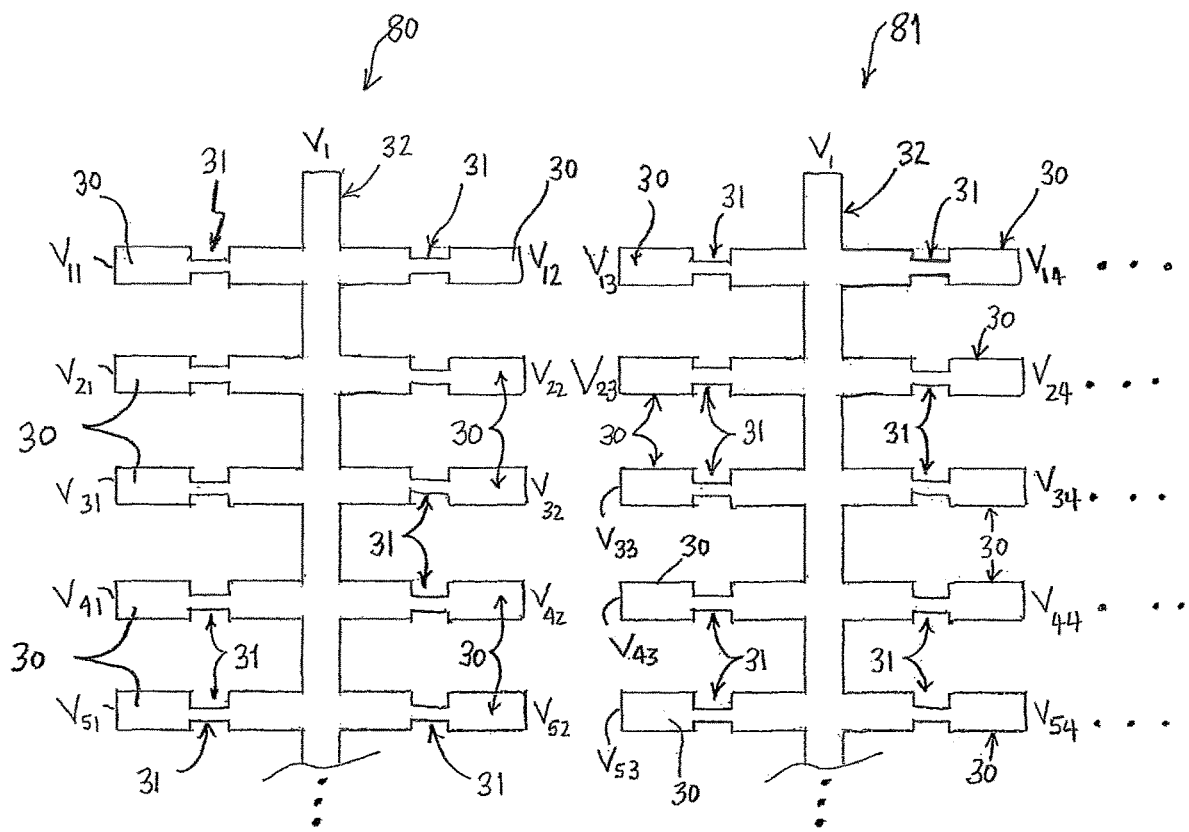
FIG. 5 schematically illustrates an array of electronically addressable pixels within the imaging apparatus of FIG. 1, according to an alternative embodiment.

Reference is now made to FIG. 5 which schematically illustrates a part of an array of electronically addressable pixels within the imaging apparatus of FIG. 1, according to an alternative embodiment. The array of pixels comprises a plurality of structurally substantially identical sub-arrays (80, 81, etc.) each of which comprises a plurality of conductive tracks (30) extending from a common single conductive line (32). Each conductive track (30) contains a section of track length which is constricted in its width and/or constricted in its thickness (31) thereby defining a pixel. Each of the conductive tracks (30) extends laterally from the conductive line (32) of the sub-array.

A first plurality of conductive tracks of the sub-array are arranged to extend laterally from one common side of a conductive line (32) in parallel and separated, neighbour-to-neighbour, by a common spacing thereby to define a first regular, linear column of pixels (31) mutually in register and adjacent to one side of the conductive line (32) they share. A second plurality of conductive tracks of the sub-array are arranged to extend laterally in common, from the other side of a conductive line (32) in parallel and separated, neighbour-to-neighbour, by a common spacing. These conductive tracks also define a second regular, linear column of pixels (31), also mutually in register and adjacent to the other side of the conductive line (32) they share with the first column of pixels. Each conductive track defining a pixel of the first column of pixels is arranged laterally in register with a pixel of the second column of pixels. This defines a part of a regular linear row of pixels. A second sub-array (81) of pixels of the plurality of sub-arrays, is arranged laterally in register with the first sub-array (80) of pixels of the plurality of sub-arrays, The second sub-array is structurally substantially identical to the first sub-array and is spaced therefrom by a spacing which separates the first column of pixels of the second sub-array from the second column of pixels of the first sub-array by a uniform spacing matching the separation between the first and second columns of each sub-array. This enables the pixels of each row of the second sub-array to cooperate with the pixels of the corresponding row of the first sub-array so as to provide a regular spacing between the pixels of the row they collectively define.

The conductive tracks (31) and lines (32) may be formed from gold, silver or other suitably conductive material, Since the tracks of a given sub-array of pixels are in electrical communication with the conductive line (32) of the sub-array, an individual pixel (31) may be addressed within this array by applying an electrical potential ($V_1$) to a terminal end of the conductive line (32) and concurrently applying an electrical potential ($V_{ij}$) to a terminal end of the conductive track (30) corresponding to the "$i^{th}$" row and the "$j^{th}$" column of the sub-array within which the pixel resides. When the two electrical potentials are substantially the same ($V_{ij}=V_1$) then substantially no potential difference (voltage) is generated across the addressed pixel, thereby inhibiting or preventing a flow of current through the pixel. Conversely, when the two applied electrical potentials differ ($V_{ij}>V_1$ or $V_{ij}<V_1$), then a voltage is generated across the pixel thereby permitting a flow of current through the pixel. As a result, pixel position (i, j) is addressed.

In particular, in the example shown in FIG. 5, with voltage $V_1$ applied to the common conductive line (32) or the first sub-array, voltages $V_{ij}$ are applied to the following pixel positions (row, column) of the first sub-array (80):

(1, 1)=$V_{11}$; (1, 2)=$V_{12}$
(2, 1)=$V_{21}$; (2, 2)=$V_{22}$
(3, 1)=$V_{31}$; (3, 2)=$V_{32}$
(4, 1)=$V_{41}$; (4, 2)=$V_{42}$
(5, 1)=$V_{51}$; (5, 2)=$V_{52}$
Etc. . . .

Similarly, with voltage $V_1$ applied to the common conductive line (32) or the second sub-array voltages $V_{ij}$ are applied to the following pixel positions (row, column) of the second sub-array (80):

(1, 3)=$V_{13}$; (1, 4)=$V_{14}$
(2, 3)=$V_{23}$; (2, 4)=$V_{24}$
(3, 3)=$V_{33}$; (3, 4)=$V_{34}$
(4, 3)=$V_{43}$; (4, 4)=$V_{44}$
(5, 3)=$V_{53}$; (5, 4)=$V_{54}$
Etc . . . .

Voltages $V_{ij}$ are applied to the pixels (row, column) of subsequent sub-arrays (not shown) of the pixel array, with voltage $V_1$ applied to the common conductive line (32) or that sub-array.

Due to the narrowing of the dimensions of the conductive track at the location of the pixel, current conducted through the pixel has a higher current density than in other parts of the conductive track thereby causing a heating of the conductive track locally at the pixel through which current is caused to flow. However, when conditions are controlled such that no electrical current flows through the pixel, then the temperature of the pixel falls. Referring again to FIG. 2, when a current is caused to flow through a pixel, and the pixel is consequentially heated, the resonance profile is represented by the broad and shallow profile (20) illustrated in FIG. 2. Conversely, when current is prevented from flowing through the pixel, and the pixel is consequentially allowed to cool, the resonance profile associated with the cooler pixel is represented by the narrower and deeper resonance profile (19) illustrated in FIG. 2.

Thus, a pixel of the pixel array is addressed by the processing unit (4) of the apparatus of FIG. 1, so as to be switched "on" to generate the salient evanescent electromagnetic field (8), when electrical current is prevented from flowing through the addressed pixel which is thereby permitted to cool and achieve a strong resonance profile (19). The processing unit (4) is arranged, in use of the apparatus (1), to maintain all of the non-addressed pixels of the pixel array (6) in an "off" state in which current is permitted to flow through them thereby to maintain them in a relatively heated state associated with the shallow and broad resonance profile (20) of FIG. 2.

Figure 6:
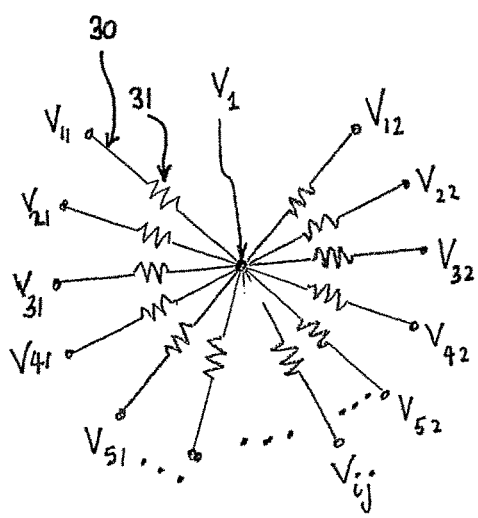
FIG. 6 schematically illustrates an equivalent circuit diagram for the array of electronically addressable pixels within the imaging apparatus of FIG. 5.

FIG. 6 schematically illustrates an equivalent circuit diagram corresponding to the array of FIG. 5, in terms of a network of resistors. With this notional equivalent diagram, useful for understanding the embodiment, each pixel (31) is notionally represented as a resistor element which Ohmically heats in response to an electrical current through it. Each conductive track (30) is notionally represented as a circuit line section and each extends radially outwardly from a common connection point to which a common voltage V1 is applied. This is the voltage applied to the conductive line of the sub-array to which each conductive tack is connected. The terminal end of each circuit line section has applied to it a respective voltage $V_{ij}$. If $V_{ij}=V_1$ then substantially no potential difference (voltage) is generated across the addressed pixel (i,j), thereby inhibiting or preventing a flow of current through the pixel. Conversely, when $V_{ij}>V_1$ or $V_{ij}<V_1$, a current flows to heat the pixel at location (i,j).

Another simple way to allow each pixel of the pixel array to be addressed individually is to remove each conductive line (32) thereby to render each conductive track (30) in electrical isolation from any of the other conductive tracks containing a pixel. The voltage $V_1$ may be applied to one terminal end of the isolated track for a given pixel, and the voltage $V_{ij}$ may be applied to the opposite end of the track. The pixel in question may be addressed by changing $V_{ij}$ to differ from $V_1$, or otherwise, to control current flow/heating therein. Thus, independent connect each one of the pixels, i.e. independently of any of the other pixels of the array, is possible.

Figure 7:
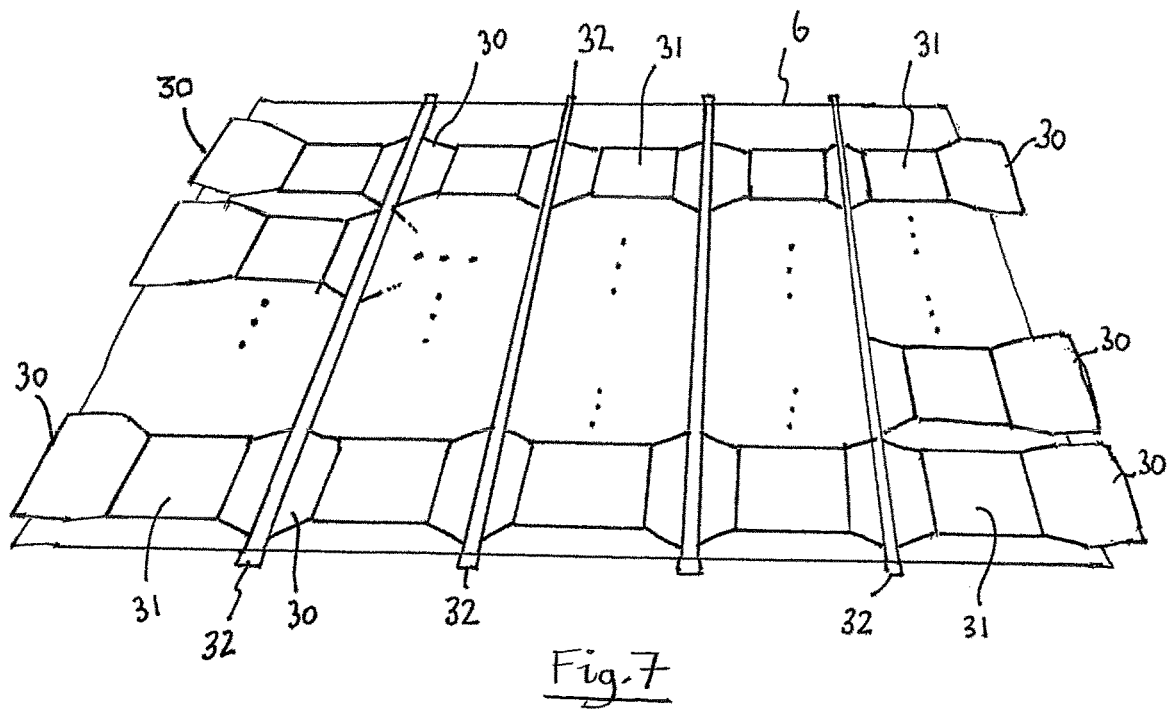
FIG. 7 schematically illustrates an array of electronically addressable pixels within the imaging apparatus of FIG. 1, according to an alternative embodiment.

FIG. 7 schematically illustrates another example of the array (6) of electronically addressable pixels of the apparatus of FIG. 1. The array comprises a plurality of parallel conductive lines (30) comprising any suitable metal, preferably gold or silver, each comprising a plurality of pixels (31) formed at regular intervals along the conductive line in question. These pixels each consist simply of a narrowing of the cross-sectional area of the conductive line over a distance along the conductive line corresponding to the dimension of the pixel in that direction. The narrowing of cross-sectional area is achieved by narrowing the conductive track in two of its three dimensions: namely in a first dimension transverse to the conductive track but lying within the plane of the pixel array; and concurrently in a second dimension perpendicular to both the conductive track and the plane pixel array. The transverse direction of the pixel simply the width of the conductive line in question.

FIG. 4 illustrates, schematically, the cross-sectional view of a conductive line (30) illustrated a narrowing of the thickness of the conductive line at a pixel (31), as also described above with reference to FIGS. 3 and 5.

Across each of the conductive tracks (30) extends a plurality of conductive lines (32) (e.g. formed from gold, silver or other suitably conductive material), which are in electrical communication with each of the conductive tracks (30) they individually extend across in a direction perpendicular to the conductive line in question. An individual pixel (31) may be addressed within this array, by applying an electrical potential to an end of any one of the conductive lines (32), and concurrently applying an electrical potential to an end of any one of the conductive tracks (30). When the two electrical potentials are substantially the same, then substantially no potential difference (voltage) is generated across the addressed pixel, thereby inhibiting or preventing a flow of current through the pixel. Conversely, when the 2 applied electrical potentials differ, then a voltage is generated across the pixel thereby permitting a flow of current through the pixel.

As described above with reference to the pixels of the arrays illustrated in FIGS. 3 and 5, due to the narrowing of the dimensions of the conductive track at the location of the pixel, current conducted through the pixel has a higher current density than in other parts of the conductive track thereby causing a heating of the conductive track locally at the pixel through which current is caused to flow. However, when conditions are controlled such that no electrical current flows through the pixel, then the temperature of the pixel falls. Referring again to FIG. 2, when a current is caused to flow through a pixel, and the pixel is consequentially heated, the resonance profile is represented by the broad and shallow profile (20) illustrated in FIG. 2. Conversely, when current is prevented from flowing through the pixel, and the pixel is consequentially allowed to cool, the resonance profile associated with the cooler pixel is represented by the narrower and deeper resonance profile (19) illustrated in FIG. 2.

Thus, a pixel of the pixel array is addressed by the processing unit (4) of the apparatus of FIG. 1, so as to be switched "on" to generate the salient evanescent electromagnetic field (8), when electrical current is prevented from flowing through the addressed pixel which is thereby permitted to cool and achieve a strong resonance profile (19). The processing unit (4) is arranged, in this example of a use of the apparatus (1), to maintain all of the non-addressed pixels of the pixel array (6) in an "off" state in which current is permitted to flow through them thereby to maintain them in a relatively heated state associated with the shallow and broad resonance profile (20) of FIG. 2.

The condition that a pixel is in the "on" when no current flows, but in the "off" state when current is caused to flow, results from the initially chosen resonance angular position of incident optical radiation. In this example, the optical radiation (13) angle of incidence is chosen to be resonant when no current flows (profile 19 of FIG. 2). The pixels are "on" when there is no current/heating but "off" when there is current/heating. Alternatively, if one chooses the incoming angle of optical radiation (13) to be resonant when current does flow (profile 20 of FIG. 2), then the pixels are "on" when current/heating flows but "off" when current does not flow.

In the present embodiment, in the "off" state, when a pixel is heated, the resonance angle of the associated resonance profile (20) is e.g. at a higher angular position. However, the angle of incidence of optical radiation (13) employed to illuminate the pixel array (6) is fixed in the apparatus of FIG. 1, and so a surface plasmon resonance is not achieved when the pixel is heated. Consequently, the evanescent field of the surface plasmon, being non-resonant, is very much smaller and less pronounced than it would be when the pixel is switched "on". This diminished evanescent field is ineffective in extending out from the pixel towards the sample (7) which, as a result, is not based by an evanescent field (8) and cannot efficiently scatter optical radiation (9) towards the objective lens (3) of the optical detector unit of the apparatus.

In the pixel array illustrated in FIG. 7, the current caused by providing a potential difference between a conductive track (30) defining one pixel row (row i), and a conductive line (32) defining one array column position (column j), will generally result in a flow of current principally through the addressed pixel (i,j). However, stray currents of lesser magnitude may also flow through adjacent pixels (31). These stray currents might lead to temperatures which in turn permit weak surface plasmons at non-addressed adjacent pixels which may induce cause the scattering of a relatively small proportion of light when interacting with any imaged sample (if present at the adjacent pixel). This may result in a modest lowering of image resolution as compared to the resolution achievable using other pixel array structures (e.g. see FIGS. 3, 5 and 9), yet still provide a higher imaging resolution than is achievable using existing imaging techniques.

Nevertheless, the effects of such stray currents may be accounted for by post-processing of raw image data from the optical detector (12), to de-convolve the optical effects of the stray currents according to a point-spread function pre-calibrated for each pixel prior to use of the imaging apparatus. To determine the point-spread function of a pixel (31) of the array of FIG. 7, one may place a calibration sample of known size and shape at the pixel in question, and detect the scattered light signal emanating from the pixel when it is addressed. The size of the calibration sample may preferably be the same size as the pixel in question so as to serve as a 'point source' of scattered light from a surface plasmon generated at the pixel in question when addressed.

Figure 8:
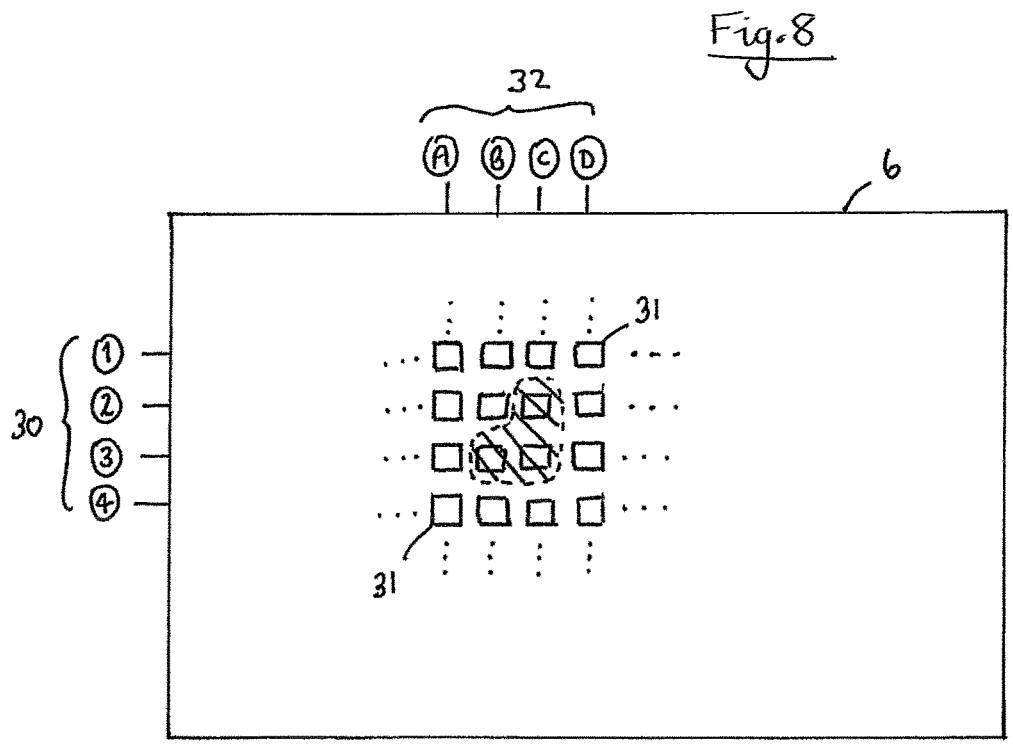
FIG. 8 schematically illustrates the array of electronically addressable pixels of any of FIGS. 3, 5 and 7.

By addressing individual pixels (31) of the array (6), one-by-one, the processing unit (4) is arranged to sample individual regions of the pixel array at a very high resolution. This is schematically illustrated in FIG. 8 which shows a 4×4 subset of pixels of the pixel array each addressable individually by the processor unit (4) in terms of the coordinates of the pixel (e.g. row 1; row 2; row 3; row 4: column A; column B; column C; column D). Only when pixels with the following coordinates are separately addressed does the processing unit receiver consequential signal from the optical detector (13) thereby indicating that the sample is adjacent the addressed pixel in question:
(2, C), (3, B), (3, C)

Figure 9:
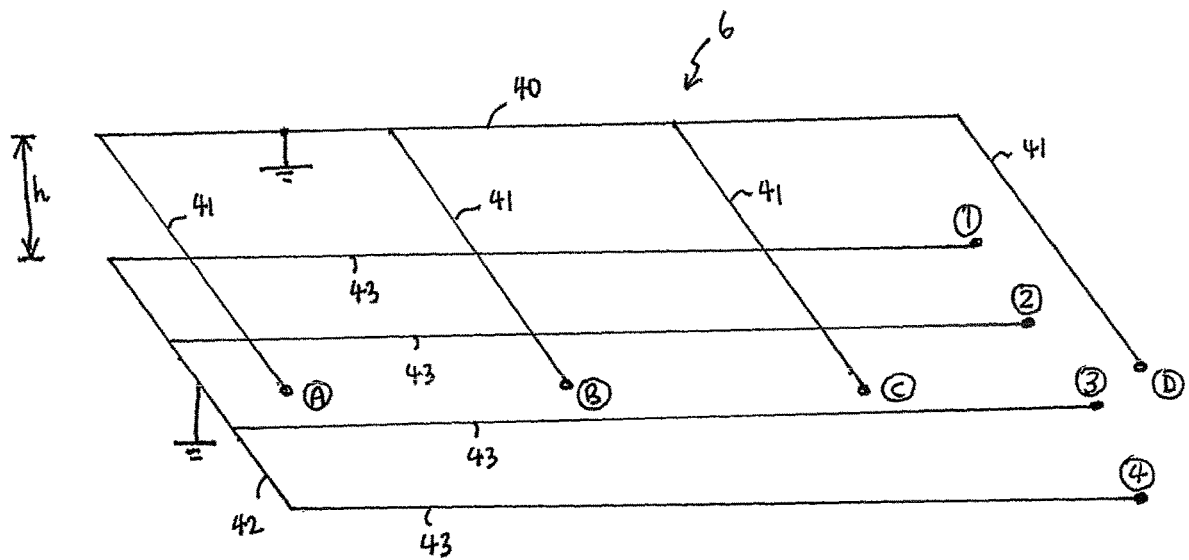
FIGS. 9 and 10 schematically illustrate an array of electronically addressable pixels within the imaging apparatus of FIG. 1, according to an alternative embodiment.
Figure 10:
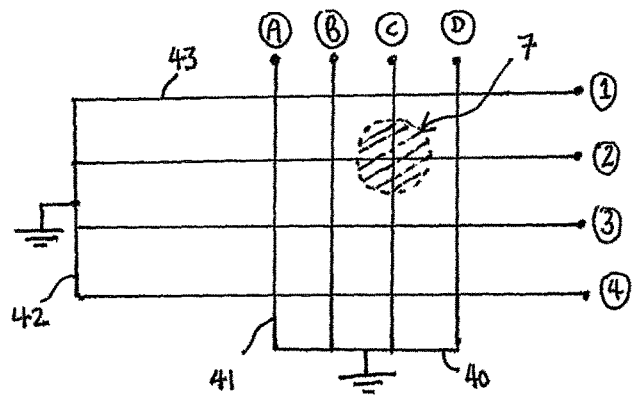

Consequently, the processing unit may build-up a pixel picture of the shape of the sample, and its size and location, based on the size and location of these 3 pixels and the shape formed by the 3 pixels collectively. In addition, the detector is able to detect not merely whether there is sample material or no sample material present at a given pixel location, but by detecting the differing brightness levels at different pixel locations, the detector is able to detect variations in the material of the sample (e.g. how opaque, degree of scattering). In addition, by detecting brightness variation across the pixel array, the detector may be able to detect if a pixel is only partially covered by sample material, as opposed to being against fully covered or not covered by sample material at all FIGS. 9 and 10 schematically illustrate an alternative arrangement for a pixel array (6) which may be employed in the apparatus of FIG. 1, in place of the pixel array illustrated in FIG. 3.

In this arrangement, the pixel array is formed by two overlapping, planar arrays of parallel linear conductive lines (41, 43) spaced from one another in plane-parallel position across an intervening separation (h). Each conductive line of any one of the two arrays terminates at one end, at a common respective ground terminal (40, 42), and terminates at the other end that an individual respective addressing terminal (A, B, C, D; 1, 2, 3, 4) electrically isolated from any of the other addressing terminals. A notional pixel is defined where one conductive line (41) of one of the two planar arrays crosses a conductive line (43) of the other of the two planar arrays, when viewed along a line of you perpendicular to the plane of the two arrays (which are parallel).

By applying an electrical potential at an addressing terminal, a potential difference is created between the addressing terminal and the common ground terminal of the array of conductive lines in question, permitting current to flow through the conductive line possessing that addressing terminal. The presence of this current causes the conductive lines to heat and, as described with reference to FIG. 2, to cause surface plasmons generated along that conductive line, by incident optical radiation (13), to be non-resonant (or to become resonant depending on the initial state). This places the conductive line in an "off" state. The processing unit (4) is arranged to apply an electrical potential to all non-addressed conductive lines to maintain them in this "off" state, and to address a selected conductive line to switch it to an "on" state by removing the electrical potential thereby preventing the flow of current and allowing the conductive lines to cool so as to permit the surface plasmons upon it to become resonant with the incident optical radiation (30) upon them. When resonant, a salient evanescent electromagnetic field is thereby generated which may be a sample (item 7; FIG. 10) placed upon the pixel array to cause optical radiation to be scattered by it for collection by the optical detector (12).

The location of the sample (7) may be determined by the processing unit (4) as follows. Each of the conductive lines (41, 43) is addressed separately and individually, line-by-line, by successively removing the electrical potential applies to the respective addressing terminals (A, B, C, D; 1, 2, 3, 4) of those lines to switch the line to an "on" state. In this schematic example of FIG. 10, consequence of this operation would be that scattered light would be detected by the optical detector unit (12) when conductive line (2) of lower array of lines (43) was addressed/switched to an "on" state, and when the conductive line (C) of the upper array of lines (41) was addressed/switched to an "on" state. The processing unit (4) is thereby able to deduce that the sample must reside at the coordinate position (2, C) within the coordinates system of the pixel array (6). The system is able to detect also how opaque the sample is, at each of the addressed pixels where the sample is present, and to what degree a pixel is covered. If multiple different fluorophores are also used in labelling the sample, the method can also distinguish e.g. what part of the cell/which organelles are located above/adjacent to the addressed pixel.

Figure 11:
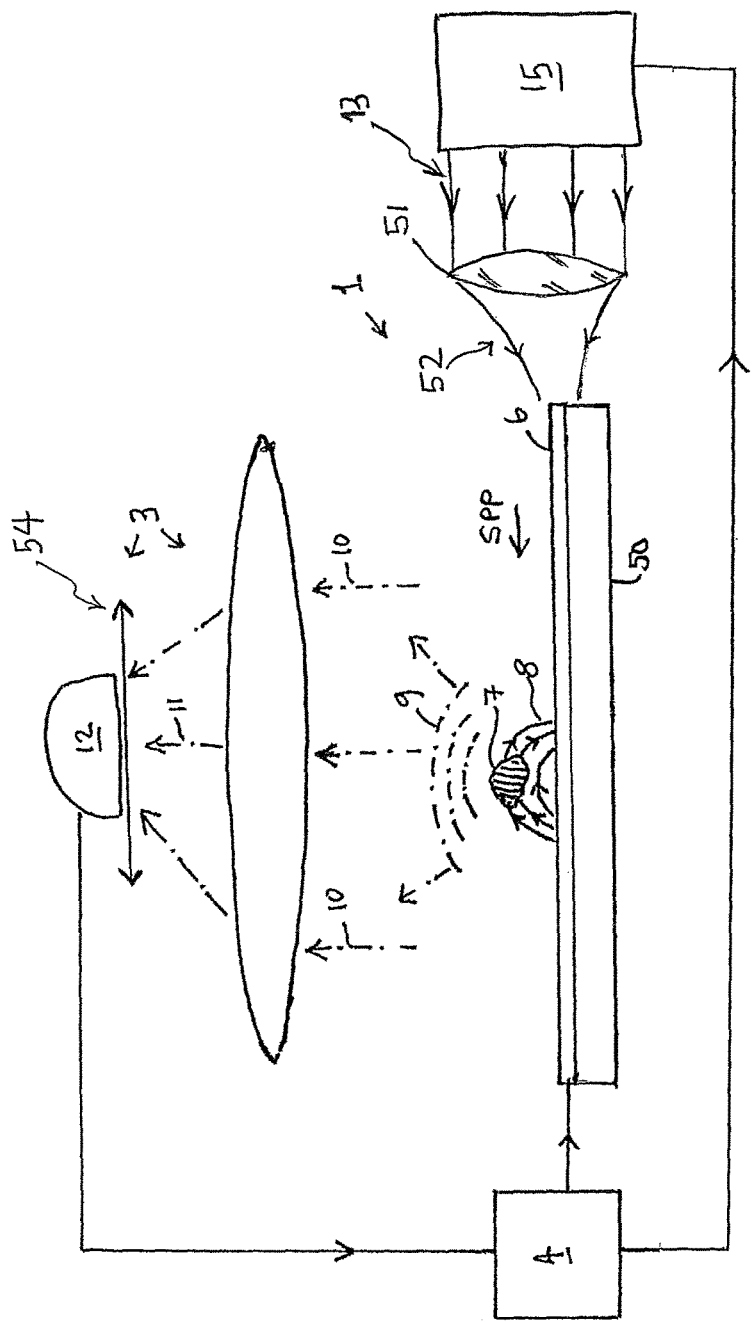
FIG. 11 schematically illustrates an imaging apparatus according to an alternative embodiment of the invention in which surface plasmons (SP) are excited in an array of electronically addressable pixels within the imaging apparatus, by light coupled to one end/side of the array at an edge thereof.

FIG. 11 schematically illustrates an imaging apparatus according to an alternative embodiment of the invention in which surface plasmons (SP) are excited in an array of electronically addressable pixels within the imaging apparatus, by light coupled to one end/side of the array at an edge thereof. In particular, an 'End-Fire' coupling arrangement is employed instead of the mechanism of matching the photon and SP momenta employed in the embodiment of FIG. 1. Rather, in this embodiment, the spatial electromagnetic field profiles of the incident photons from the light source (15) are matched to the spatial electromagnetic field profiles of SPs. An optical system (51) is arranged to receive light (13) from the light source (15) and to focus on an end facet of the pixel array (6) which is disposed on an upper surface of a dielectric substrate (e.g. transparent/transmissive optically) so that it overlaps well with the fields of SPs of the pixel array. Preferably, the focused incident optical radiation (52) is a TM-polarised optical beam. Such polarised light couples more efficiently to SPs on the surface of the pixel array. In addition, optionally, a linear polarising filter (analyser) element (54) may be arranged in front of the optical detector unit (12) which oriented to block optical radiation resulting from the direct scattering (Rayleigh Scattering) of incident radiation (52) from the light source. Such Rayleigh-scattered light is highly polarised and can be removed from the light incoming to the optical detector unit (12), whereas light (10) generated by the interaction of a SP with a sample (7) is not polarised in the same way and may be transmitted through the linear polarising filter (54). Furthermore, the use of such a polarising filter may be made in any embodiment described herein so as to enhance image contrast. This may be achieved by adjusting the position angle (i.e. of the polarising axis of the filter) to favour the preferred polarisation of light scattered from the evanescent field of surface plasmons, by the imaged sample. The optical system (51) may be a system of one or more lenses and/or may comprise an end of an optical fibre (e.g. but-coupled to the end facet of the substrate 50).

Figure 12:
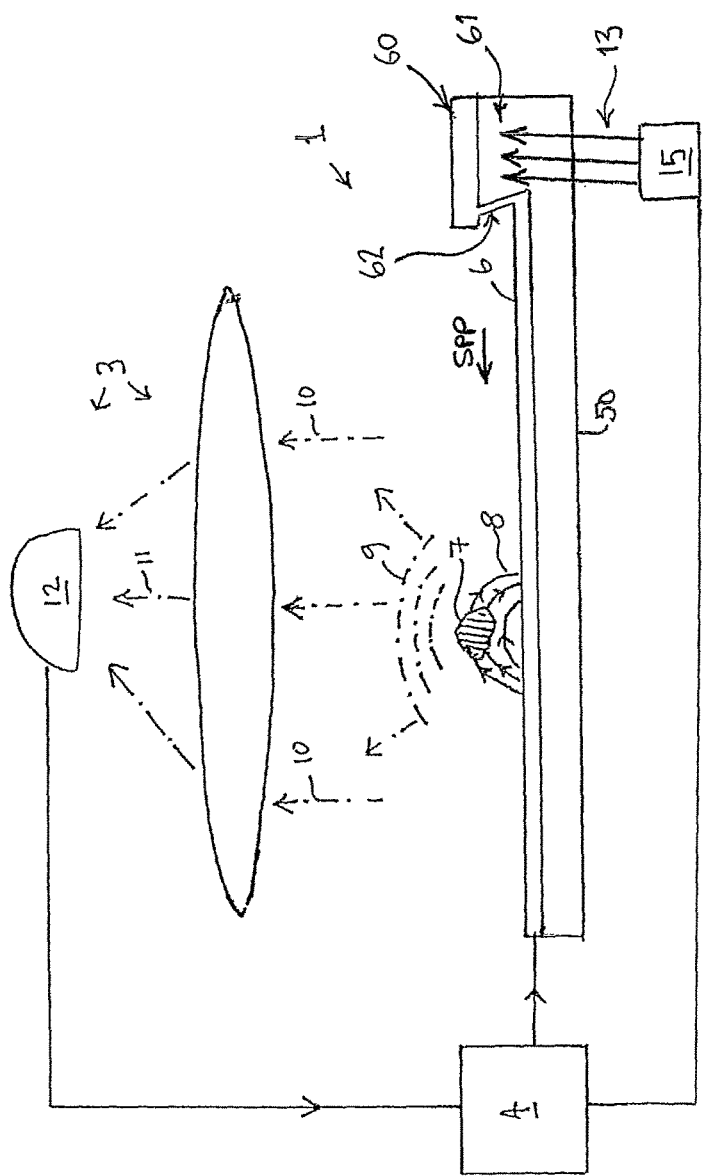
FIG. 12 schematically illustrates an imaging apparatus according to an alternative embodiment of the invention in which surface plasmons (SP) are excited in an array of electronically addressable pixels within the imaging apparatus, by light coupled in to one end/side of the array via the underside of the array.

FIG. 12 schematically illustrates an imaging apparatus according to an alternative embodiment of the invention in which surface plasmons (SP) are excited in an array of electronically addressable pixels within the imaging apparatus, by light coupled in to one end/side of the array via the underside of the array. In this arrangement, light is coupled with SPs via a "Step-Gap Leakage" mechanism. The step-gap structure (60, 61, 62) is formed in the dielectric substrate (50) upon which the pixel array (6) is disposed. It comprises a dielectric support layer (61) with refractive higher than 1.0, an optically-thick top metal layer (e.g. Ag) and the metal pixel array layer (6), the two being connected by an optically-thin metal film (62), forming a step-gap. The light source (15) is arranged to direct light from the bottom side of the structure to inject photons therein. The optically-thick top (60) and pixel array (6) metal layers preclude the direct transmission of photons through the device, such that the only path is through the step-gap. When photons from the dielectric side leak through the step gap, they acquire momentum to excite and couple to SPs along the top surface of the pixel array layer. Thus, the step-gap leakage scheme has minimal requirements for collimation of the input light source (15). It separates input photons from the out-coupled SPs, optimizing the signal-to-noise ratio at the optical detector unit (12).

Preferably, the array may comprise a plurality of separate such step-gap leakage structures (not shown) arranged at spaced intervals across the array, and which each serve to receive light from a light source (such as light source 15, or a separate light source) and to inject photons into the array to generate surface plasmons as described above.

Figure 13:
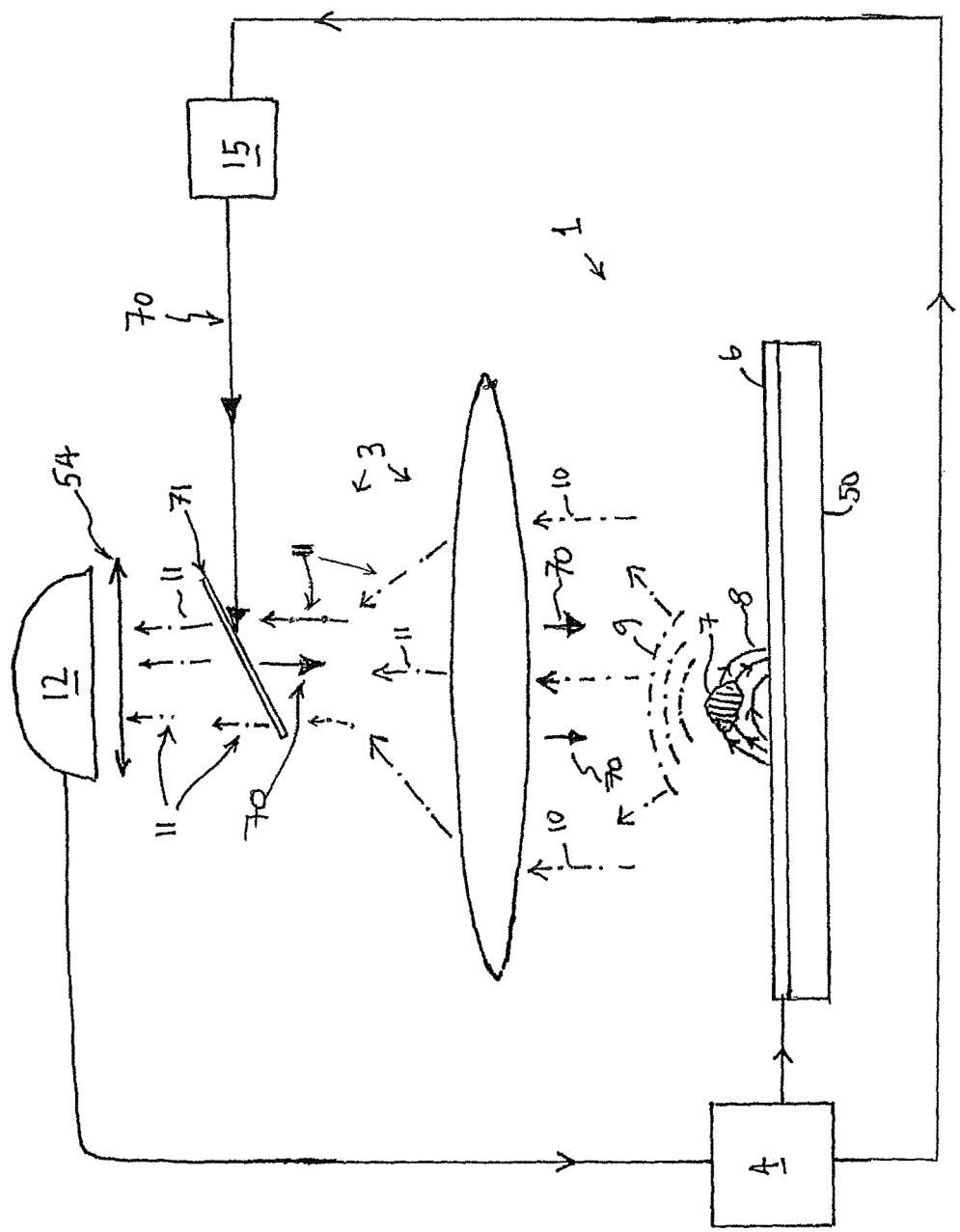
FIG. 13 schematically illustrates an imaging apparatus according to an alternative embodiment of the invention in which surface plasmons (SP) are excited in an array of electronically addressable pixels within the imaging apparatus, by light directed onto the array using the same optical element(s) used to collect scattered light for detecting a sample upon the array.

FIG. 13 illustrates a further optional implementation of an embodiment of the invention. Here, excitation light for exciting surface plasmons is directed through the same optics used to collect the light scattered from plasmons by a sample. In particular, light (70) from the light source (15) is directed to a 45 degree dichroic mirror (71) (Note: a half-silvered mirror is an alternative) which reflects that light to the objective lens (3) which, in turn, directs the light on to the pixel array (6) to excite plasmons. The plasmon excitation process is according to the 'grating' and/or 'rough surface' excitation regime described above. The dichroic mirror is arranged to transmit light (11) scattered from surface plasmons, which generally has a wavelength different to that of the excitation light wavelength. This allows the scattered light to reach the optical detector unit (12), via the objective lens and the dichroic mirror. Back-scattered light (70) originating from the light source (15), and scattered by the sample or the pixel array towards the objective lens and dichroic mirror, along with plasmon-originating light (11) is prevented from reaching the detector by the dichroic mirror. A filter (54) is optionally placed in the optical path between the dichroic mirror and the optical detector unit (12), and may either be a polaroid filter positioned to be sympathetic to the polarisation of scattered light which is plasmon-originating, or may be a colour filter arranged to block the wavelength of the excitation light (70).

The "dichroic mirror" operates based on the principle of thin-film interference (as is well known in the art) and has a high reflectivity for the excitation source wavelength and a high transmission for the light scattered back from surface plasmons on the pixel array (e.g. of the order of 90% transmission). This is particularly conducive to fluorescence microscopy because, in that case, the information-bearing light is red-shifted in comparison to the excitation wavelength. Consequently, one may employ a long-pass dichroic mirror (sometimes also referred to as a dichroic beamsplitter). However, other spectroscopic techniques (e.g. Raman Anti-stokes) may require a short-pass dichroic mirror, as appropriate.

The optional use of a polarising filter (54) may allow light polarisation instead of light wavelengths to be used for discrimination. Alternatively, or in addition, the beamsplitter/mirror may be birefringent so as to be arranged for reflecting light of a particular linear polarisation onto the pixel array and sample. Before the reflected, polarised light reaches the sample it may be passed through a quarter wave plate (Not shown) which would be located e.g. directly below the beamsplitter/mirror, which changes the linear polarisation of that light into a circular polarisation state. Scattered light from the sample travelling back towards the quarter-wave plate will pass through the quarter-wave plate for a second time which changes the circular polarisation state in to a linear polarisation state again. However, the orientation of the linear polarisation state produced in this way is orthogonal to the original linear polarisation state of the light initially reflected from the birefringent dichroic mirror. This final linear polarisation state/orientation is not reflected by the birefringent mirror but, instead is transmitted by that mirror. This technique permits discriminating excitation light from detection light without restrictions to the useful wavelength range and can also be used for elastic scattering.

In any of the above embodiments, optionally, a transparent dielectric cover layer may be disposed over the top of the pixel array as a protective layer. In some embodiments, this may result in the pixel layer being sandwiched between two dielectric layers collectively acting as a waveguide.

The invention claimed is:

1. An imaging apparatus for optical sub diffraction imaging of a sample, the imaging apparatus comprising:
   an array of electronically addressable pixels wherein each pixel is arranged to support a surface plasmon resonance therein to generate an evanescent electromagnetic field which extends transversely from the pixel so as to be salient from plane of the array for illuminating the sample, the pixel array being formed by two overlapping arrays of conductive lines spaced apart from one another;
   a light source arranged to illuminate the array to generate said surface plasmon resonance at any given pixel of the array when a temperature of the given pixel is a first temperature value;
   an optical detector arranged for detecting optical radiation scattered directly from the evanescent electromagnetic field by the sample; and
   a processing unit arranged to selectively electronically address individual pixels, or groups of pixels, of the array in succession by:
   (i) adjusting the current through the conductive lines of the array to control a temperature of a selected pixel or pixels of the array to the first temperature value to thereby generate the surface plasmon resonance and induce the direct scattering of the optical radiation from the evanescent electromagnetic field by the sample, to be detected by the optical detector, in the presence of illumination of the array from the light source;
   (ii) to thereby associate the detected optical radiation with the address of the selected pixel or pixels within the array at which the surface plasmon resonance was generated; and
   (iii) while maintaining a fixed angle of the light source, reversibly changing said temperature of the selected pixel or pixels from the first temperature value to a second temperature value sufficiently different to the first temperature value to render said surface plasmon of the selected pixel or pixels non-resonant, and adjusting the current through the conductive lines of the array to control a temperature of a next selected pixel or pixels of the array to the first temperature value to thereby successively select the next selected pixel or pixels to be electronically addressed.

2. An imaging apparatus according to claim 1 wherein:
the second temperature value exceeds said first temperature value.

3. An imaging apparatus according to claim 1 wherein:
a said pixel comprises a portion of an electrically conductive line which is of lower cross-sectional area than adjacent parts of the electrically conductive line either side of the pixel along the electrically conductive line.

4. An imaging apparatus according to claim 1 wherein:
a pixel forms a conductive bridge electrically connecting a conductive line of one of the two arrays to a conductive line of the other of the two arrays.

5. An imaging apparatus according to claim 1 wherein:
a pixel is defined where one conductive line of one of the two arrays overlaps a conductive line of the other of the two arrays.

6. An imaging method for optical sub diffraction imaging of a sample, the imaging method comprising:
providing an array of electronically addressable pixels wherein each pixel is arranged to support a surface plasmon resonance therein to generate an evanescent electromagnetic field which extends transversely from the pixel so as to be salient from plane of the array for illuminating the sample, the pixel array being formed by two overlapping arrays of conductive lines spaced apart from one another;
illuminating the array with a light source to generate said surface plasmon resonance at any given pixel of the array when a temperature of the given pixel is a first temperature value;
detecting optical radiation scattered directly from the evanescent electromagnetic field by the sample;
selectively electronically addressing individual pixels, or groups of pixels, of the array in succession by:

(i) adjusting the current through the conductive lines of the array to control a temperature of a selected pixel or pixels of the array to the first temperature value to thereby generate the surface plasmon resonance and induce the direct scattering of the optical radiation from the evanescent electromagnetic field by the sample, to be detected by the optical detector, in the presence of illumination of the array from the light source;

(ii) thereby associating the detected optical radiation with the address of the selected pixel or pixels within the array at which the surface plasmon resonance was generated; and (iii) while maintaining a fixed angle of the light source, reversibly changing said temperature of the selected pixel or pixels from said first temperature value to a second temperature value sufficiently different to the first temperature value to render said surface plasmon of the selected pixel or pixels non-resonant, and adjusting the current through the conductive lines of the array to control a temperature of a next selected pixel or pixels of the array to the first temperature value to thereby successively select the next selected pixel or pixels to be electronically addressed.

7. A method according to claim 6 wherein:
the second temperature value exceeds said first temperature value.

8. A method according to claim 6 wherein:
a said pixel comprises a portion of an electrically conductive line which is of lower cross-sectional area than adjacent parts of the electrically conductive line either side of the pixel along the electrically conductive line.

9. A method according to claim 6 wherein:
a pixel forms a conductive bridge electrically connecting a conductive line of one of the two arrays to a conductive line of the other of the two arrays.

10. A method according to claim 6 wherein:
a pixel is defined where one conductive line of one of the two arrays overlaps a conductive line of the other of the two arrays.

* * * * *